United States Patent
Arai et al.

(10) Patent No.: US 12,176,520 B2
(45) Date of Patent: Dec. 24, 2024

(54) POSITIVE ELECTRODE ACTIVE MATERIAL, METHOD FOR PRODUCING POSITIVE ELECTRODE ACTIVE MATERIAL, POSITIVE ELECTRODE, AND SECONDARY BATTERY

(71) Applicant: SANOH INDUSTRIAL CO., LTD., Tokyo (JP)

(72) Inventors: Yoshiyuki Arai, Ibaraki (JP); Kazuyuki Sugita, Ibaraki (JP); Atsushi Honda, Ibaraki (JP); Yuichiro Takimoto, Ibaraki (JP); Hideki Kurihara, Saitama (JP); Masashi Inamoto, Saitama (JP); Kyousuke Doumae, Fukui (JP)

(73) Assignee: Sanoh Industrial Co., Ltd., Tokyo (JP)

(*) Notice: Subject to any disclaimer, the term of this patent is extended or adjusted under 35 U.S.C. 154(b) by 263 days.

(21) Appl. No.: 16/646,654

(22) PCT Filed: Sep. 12, 2018

(86) PCT No.: PCT/JP2018/033741
§ 371 (c)(1),
(2) Date: Mar. 12, 2020

(87) PCT Pub. No.: WO2019/054395
PCT Pub. Date: Mar. 21, 2019

(65) Prior Publication Data
US 2020/0403226 A1    Dec. 24, 2020

(30) Foreign Application Priority Data
Sep. 15, 2017   (JP) ................................ 2017-177820

(51) Int. Cl.
C01G 31/02    (2006.01)
H01M 4/04    (2006.01)
(Continued)

(52) U.S. Cl.
CPC ......... H01M 4/364 (2013.01); H01M 4/0471 (2013.01); H01M 4/131 (2013.01);
(Continued)

(58) Field of Classification Search
None
See application file for complete search history.

(56) References Cited

U.S. PATENT DOCUMENTS 7,214,446 B1 * 5/2007 Bi ........................ B82Y 30/00
                                                                429/231.2
2011/0095242 A1 * 4/2011 Jin ........................ C09D 17/007
                                                                252/583
(Continued)

FOREIGN PATENT DOCUMENTS

CN        102251113 A    11/2011
CN        104124446 A    10/2014
(Continued)

OTHER PUBLICATIONS

English translation of JP 2012/116737 (Year: 2012).*
(Continued)

*Primary Examiner* — Yoshitoshi Takeuchi
(74) *Attorney, Agent, or Firm* — Calfee, Halter & Griswold LLP

(57) ABSTRACT

The invention discloses a positive electrode active material for a magnesium secondary battery or lithium ion secondary battery, including: a particle including a nucleus and a crystal of vanadium oxide grown from the nucleus as a starting point and having a maximum length of 5 μm or less in the major axis direction.

9 Claims, 20 Drawing Sheets

(51) Int. Cl.
*H01M 4/131* (2010.01)
*H01M 4/133* (2010.01)
*H01M 4/1391* (2010.01)
*H01M 4/1393* (2010.01)
*H01M 4/36* (2006.01)
*H01M 4/525* (2010.01)
*H01M 10/0525* (2010.01)
*H01M 10/054* (2010.01)
*H01M 4/02* (2006.01)

(52) U.S. Cl.
CPC ......... *H01M 4/133* (2013.01); *H01M 4/1391* (2013.01); *H01M 4/1393* (2013.01); *H01M 4/525* (2013.01); *H01M 10/0525* (2013.01); *H01M 10/054* (2013.01); *H01M 2004/028* (2013.01)

(56) References Cited

U.S. PATENT DOCUMENTS

| | | | | |
|---|---|---|---|---|
| 2013/0102084 | A1* | 4/2013 | Loh | B82Y 40/00 |
| | | | | 204/157.43 |
| 2014/0287311 | A1* | 9/2014 | Wang | H01M 4/525 |
| | | | | 429/231.95 |
| 2015/0228969 | A1 | 8/2015 | Cho et al. | |
| 2015/0380732 | A1* | 12/2015 | Xie | H01M 4/366 |
| | | | | 427/126.3 |
| 2017/0005340 | A9* | 1/2017 | Rojeski | H01M 4/8626 |
| 2017/0309919 | A1* | 10/2017 | Rojeski | H01M 12/08 |

FOREIGN PATENT DOCUMENTS

| | | | | |
|---|---|---|---|---|
| CN | 106129349 | * | 11/2016 | ............. B82Y 30/00 |
| CN | 106702423 | * | 5/2017 | ............... C25B 1/04 |
| CN | 107500355 | | 12/2017 | |
| JP | 2003282371 | | 10/2003 | |
| JP | 2009-263158 A | | 11/2009 | |
| JP | 2011054389 | | 3/2011 | |
| JP | 2012116737 | * | 6/2012 | ............. C01G 31/02 |
| JP | 2013058348 | | 3/2013 | |
| JP | 2015071531 | | 4/2015 | |
| RU | 2100464 | | 12/1997 | |

OTHER PUBLICATIONS

Mukherjee et al., Direct Investigation of Mg Intercalation into the Orthorhombic V2O5 Cathode Using Atomic-Resolution Transmission Electron Microscopy, 29, Chem. Matl., 2218-26 (Feb. 13, 2017) (Year: 2017).*
English translation of CN 106129349 (Year: 2016).*
English translation of CN 106702423 (Year: 2017).*
European Search Report from 18856269.8 dated May 11, 2021.
Notice of Allowance from Japanese Application No. 2017-177820 dated Nov. 30, 2021.
Hibino, Mitsuhiro et al., "The Structural Analysis and Lithium Intercalation of Amorphous Vanadium Oxide Gel", Production research 52, 516 (Nov. 2000).
J.C. Trombe, et. al, "Synthesis of new mixed valence compounds MV5+V 4 2 +O7(M=NH4, K): Crystal structure of NH4V3O7 and electrical properties of KV3O7," Journal of Solid State Chemistry, 180 (2007) pp. 2102-2109.
Wang, Nian et al. "Selected-control hydrothermal synthesis and formation mechanism of 1D ammonium vanadate", Journal of Solid State Chemistry, 181 (2008), pp. 652-657.
Encyclopedic Dictionary of Chemistry, 1st edition, Tokyo Kagaku Dojin KK (section "vanadium oxide"), Oct. 20, 1989, pp. 881-882.
International Search Report and Written Opinion from PCT/JP2018/033741 dated Dec. 18, 2018 along with English translation of International Search Report.
Office Action from Chinese Application No. 201880058599.0 dated Apr. 28, 2023. (English translation of Search Report attached).
Office Action from Chinese Application No. 201880058599.0 dated Jul. 28, 2022. (English translation of Search Report attached).

* cited by examiner

POSITIVE ELECTRODE ACTIVE MATERIAL, METHOD FOR PRODUCING POSITIVE ELECTRODE ACTIVE MATERIAL, POSITIVE ELECTRODE, AND SECONDARY BATTERY

RELATED APPLICATIONS

The present application is the national stage entry of PCT/JP2018/033741, filed on Sep. 12, 2018, which claims priority based on Japanese Patent Application No. 2017-177820 filed on Sep. 15, 2017, the contents of both applications are incorporated herein by reference.

TECHNICAL FIELD

The present invention relates to a positive electrode active material, a method for producing a positive electrode active material, a positive electrode, and a secondary battery.

BACKGROUND ART

As a positive electrode active material for a secondary battery, there is a material containing a vanadium oxide. A positive electrode active material containing vanadium oxide for a secondary battery is one of the positive electrode materials that can be expected to realize a high-capacity secondary battery. In particular, vanadium oxide is one of the few positive electrode materials capable of inserting and removing magnesium ions. For this reason, the use of vanadium oxide as a positive electrode material for a magnesium secondary battery has been studied.

For example, in Non-Patent Document 1, it is reported that vanadium pentoxide xerogel, in which water is inserted between layers of a layered structure of vanadium pentoxide and the layers are widened, can stably insert and remove magnesium ions.

Patent Document 1 describes a method of producing a positive electrode including a mixing step of preparing a mixed material in which vanadium and a carbon material are mixed, and a heat treatment step of heat-treating the mixed material obtained in the mixing step at 275° C. or higher in an oxidizing atmosphere. Patent Document 1 discloses that the deterioration of the negative electrode caused by the reaction with water is suppressed by removing water existing between layers of vanadium oxide or the like by heat treatment.

Patent Document 2 describes a method of producing an electrode for an electrochemical power storage device comprising a step of mixing a ruthenium compound, a vanadium compound, and a tungsten compound with an electrode base material to obtain a mixture, and a step of heat-treating the mixture, wherein the vanadium compound contains vanadium oxide.

Non-Patent Documents 2 and 3 describe that in the case that an alkali solution in which vanadium oxide is dissolved is adjusted to be acidic to precipitate crystals of vanadium oxide, a rod-like crystal of vanadium oxide may grow when excess cations (ammonium ion, copper ion, iron ion, etc.) are added. Non-Patent Document 2 and Non-Patent Document 3 report that a material obtained by firing rod-like crystal of vanadium oxide at a high temperature exhibits high performance as a positive electrode active material for a lithium ion battery.

Patent Document

[Patent Document 1] Japanese Unexamined Patent Application Publication No. 2011-054389

[Patent Document 2] Japanese Unexamined Patent Application Publication No. 2003-282371

[Patent Document 3] Japanese Unexamined Patent Application Publication No. 2013-58348

Non-Patent Document

[Non-Patent Document 1] M. Hibino, Y Ikeda, Y Noguchi, T. Kudo; Production Research, 52, 516 (2000).

[Non-Patent Document 2] J. C Trombe, etc., J. Solid State Chem. 180 2102-2109 (2007).

[Non-Patent Document 3] N. Wang, J. Soild State Chem. 181, 652-657 (2008).

SUMMARY OF THE INVENTION

However, there is a need for improvement in battery performance for all of the magnesium secondary batteries and the lithium ion secondary batteries using vanadium oxide described in any of the documents.

The present inventors have speculated that ion migration is inhibited due to the growth of vanadium oxide crystals.

The crystal of vanadium oxide can be precipitated in an acidic solution at a temperature of 50° C. or higher, and is preferably precipitated at a temperature of 60° C. or higher. When the temperature for precipitating the vanadium oxide is 60° C. or higher, the vanadium oxide can be suppressed from being gelatinized.

However, as shown below, when the precipitation temperature is increased, rod-like crystals of vanadium oxide grow. A magnesium secondary battery using a rod-shaped crystal of vanadium oxide as a positive electrode active material has insufficient battery capacity and cycle retention of the positive electrode. In addition, a lithium ion secondary battery using a rod-shaped crystal of vanadium oxide as a positive electrode active material cannot obtain sufficient rate characteristics.

When the temperature at which vanadium oxide is precipitated is lowered, the growth of rod-shaped crystals can be suppressed. However, as shown below, when the precipitation temperature of the vanadium oxide is lowered, the yield of the vanadium oxide is lowered, so that improvement has been required.

EXPERIMENTAL EXAMPLES 1 TO 6

A vanadium compound solution shown below was mixed with a solution in which the cations shown below were dissolved to form a mixed solution.

The mixed solution was then converted to an acidic solution of pH 3 using sulfuric acid. Thereafter, the acidic solution was stirred at any of the temperatures of 50° C. (Experimental example 1), 55° C. (Experimental example 2), 60° C. (Experimental example 3), 70° C. (Experimental example 4), 75° C. (Experimental example 5) and 80° C. (Experimental example 6) for 5 hours to precipitate a vanadium oxide crystal.

Next, the precipitated vanadium oxide crystal was then filtered, washed, dried, and fired at a temperature of 290° C.

The positive electrode active materials of Experimental example 1 to Experimental example 6 were obtained by the above steps.

(Vanadium Compound Solution)

Ammonium metavanadate ($NH_4VO_3$) (manufactured by Taiyo Mining Co., Ltd.): 1.17 g Ammonia water (30%): 1 ml Pure water: 35 ml (Solution in which the Cation is Dissolved)
  Ammonium fluoride: 2.22 g
  Pure water: 10 ml The positive electrode active materials in Experimental examples 1 to 6 were observed using a scanning electron microscope (SEM). The results are shown in FIGS. 9 to 14. FIG. 9 is an image of Experimental example 1, FIG. 10 is an image of Experimental example 2, FIG. 11 is a photograph of Experimental example 3, FIG. 12 is an image of Experimental example 4, FIG. 13 is an image of Experimental example 5, and FIG. 14 is an image of Experimental example 6.

As shown in FIG. 9, in Experimental example 1 in which a crystal of vanadium oxide was precipitated at 50° C., a crystal of vanadium pentoxide having a maximum length in the major axis direction exceeding 5 μm was precipitated. These crystals were obtained by firing the gelled vanadium oxide formed in the acidic solution.

As shown in FIGS. 10 to 13, in Experimental examples 2 to 5 in which vanadium oxide crystals were precipitated at 55° C. to 75° C., the maximum length of the precipitated crystals in the major axis direction was not larger than 5 μm.

As shown in FIG. 14, in Experimental example 6 in which a vanadium oxide crystal was precipitated at 80° C., a rod-shaped crystal having a maximum length exceeding 5 μm in the major axis direction was precipitated.

"Magnesium Secondary Battery"

Using the positive electrode active materials of Experimental examples 1 to 6, three-electrode test cells of magnesium secondary batteries were formed by the following method, and the charge/discharge characteristics were evaluated.

Each positive electrode active material, acetylene black as a conductive agent, and polyvinylidene fluoride (PVDF) as a binder were used at a mass ratio of 7:2:1, and N-methyl-2-pyrrolidone (NMP) was used as a solvent to form a slurry. The obtained slurry was applied to carbon paper as a positive electrode current collector, and dried at 130° C. to obtain a positive electrode.

A magnesium ribbon was used as a counter electrode and a reference electrode.

As the electrolyte, one composed of triethylene glycol dimethyl ether (Trade name; Triglyme, manufactured by Sankyo Chemical Co., Ltd.) containing 0.3 mol/l of magnesium bis(trifluoromethanesulfonyl)amide and 0.6 mol/l of succinic anhydride was used.

Three-electrode test cells of Experimental examples 1 to 6 were obtained by placing the above-described positive electrode, the counter electrode, the reference electrode, and the electrolyte in a sealed beaker cell in an argon atmosphere.

The obtained three-electrode type test cells were installed in a charge/discharge device (Trade name: TOSCAT3100, manufactured by Toyo System Co., Ltd.) and subjected to a multiple charge/discharge test to examine the relationship between the battery capacity and the potential of the positive electrode (charge/discharge curve). The results are shown in FIG. 7 and FIGS. 15 to 19

FIG. 15 shows the results of Experimental example 1, FIG. 16 shows the results of Experimental example 2, FIG. 17 shows the results of Experimental example 3, FIG. 18 shows the results of Experimental example 4, FIG. 19 shows the results of Experimental example 5, and FIG. 7 shows the results of Experimental example 6.

The arrow in FIG. 15 indicates the approximate transition direction of the charge/discharge curve with respect to the increase in the number of times of charge/discharge. The arrows described in the graph of the charge/discharge curve in this specification are the same in other drawings.

As shown in FIG. 15, in Experimental example 1 in which vanadium oxide crystals were precipitated at 50° C., the cycle retention was low. When measured from the scanning electron micrograph (SEM image (FIG. 9)) of Experimental example 1, this vanadium oxide crystal had a maximum length in the major axis direction of 5 μm or more.

As shown in FIGS. 16 to 19, in Experimental examples 2 to 5 in which vanadium oxide crystals were precipitated at 55° C. to 75° C., a high cycle retention was obtained. When measured from the SEM images of Experimental examples 2 to 5 (FIGS. 10 to 13), the maximum lengths of these vanadium oxide crystals in the major axis direction were 1 m in Experimental example 2, 2 μm in Experimental example 3, 3 μm in Experimental example 4, and 3 μm in Experimental example 5, and all of them were 5 μm or less.

As shown in FIG. 7, in Experimental example 6 in which vanadium oxide crystals were precipitated at 80° C., the cycle retention was low. The maximum length in the major axis direction of the crystal of the vanadium oxide in Experimental example 6 was 5 μm or more when measured from the SEM image (FIG. 14).

From these facts, it can be concluded that when the maximum length of the crystal of the vanadium oxide in the major axis direction exceeds 5 μm, the cycle characteristics of the magnesium secondary battery are significantly reduced. It is considered that this is because of an increase in ion migration resistance due to crystal growth. The increase in migration resistance causes cycle deterioration of magnesium ions that move slowly in a solid, and lowers the rate characteristics of lithium ions even that the lithium ions move quickly in a solid. Therefore, in order to obtain good battery performance, it is presumed that the maximum length in the major axis direction of the vanadium oxide must be controlled to 5 μm or less.

For each of the positive electrode active materials in Experimental examples 1 to 6, the yield was calculated by the following equation.

$$\text{Yield}(\%) = \{\text{recovered amount(g)/theoretical synthesis amount(g)}\} \times 100$$

As a result, the yields of the vanadium oxide crystals of Experimental examples 2 to were all about 30%, and it was necessary to improve the yield.

The present invention, which has been made in view of the above circumstances, is related to a positive electrode active material which can be produced in a high yield and can form a positive electrode having a high battery capacity, a magnesium secondary battery that has a positive electrode using the positive electrode active material and has a high cycle retention rate, and a lithium ion secondary battery that has the positive electrode using the positive electrode active material and has a high rate characteristic, and a method for producing the same.

Another object of the invention is to provide a positive electrode having a high battery capacity including the above-described positive electrode active material, and a secondary battery including the positive electrode.

The present invention relates to the following inventions.

[1] A positive electrode active material for a magnesium secondary battery or lithium ion secondary battery, comprising:
  a particle comprising a nucleus and a crystal of vanadium oxide grown from the nucleus as a starting point and having a maximum length of 5 μm or less in the major axis direction.

[2] The positive electrode active material according to [1], wherein the nucleus is formed of at least one selected from the group consisting of a titanium compound, an iron compound, and graphite.

[3] A positive electrode comprising the positive electrode active material according to [1] or [2].

[4] A secondary battery comprising the positive electrode according to [3], wherein the secondary battery is a lithium ion secondary battery or a magnesium secondary battery.

[5] A method for producing a positive electrode active material for a magnesium secondary battery or a lithium ion secondary battery, comprising:
- a step (1) of mixing a nucleation material solution in which the nucleation material is dissolved or dispersed and a solution containing a vanadium compound to form a mixed solution;
- a step (2) of adjusting the mixed solution to be acidic; and
- a precipitation step (3) of precipitating a crystal of vanadium oxide,
- wherein the precipitation step is
- a step (3a) of precipitating vanadium oxide starting from a nucleus by precipitating the nucleus in the mixed solution, or
- a step (3b) of precipitating vanadium oxide starting from the nucleation material dispersed in the mixed solution.

[6] The method for producing a positive electrode active material according to [5], wherein the nucleation material is at least one selected from the group consisting of a titanium compound, an iron compound, and graphite.

[7] The method for producing a positive electrode active material according to [5] or [6], wherein the precipitation step is performed at a temperature of 50 to 100° C.

[8] The method for producing a positive electrode active material according to any one of [5] to [7], wherein the mixed solution comprises a carbonate compound.

[9] The method for producing a positive electrode active material according to [8], wherein the carbonate compound is at least one selected from the group consisting of sodium carbonate, ammonium carbonate, potassium carbonate, lithium carbonate, sodium hydrogen carbonate, ammonium hydrogen carbonate, and potassium hydrogen carbonate.

[10] The method for producing a positive electrode active material according to any one of [5] to [9], further comprising a step of firing the vanadium oxide crystals precipitated in the precipitation step at a temperature of 260 to 315° C.

[11] A positive electrode active material for a magnesium secondary battery or lithium ion secondary battery, comprising:
- a particle comprising a crystal of a vanadium oxide which is grown from a nucleus as a starting point and whose growth is suppressed to a maximum length of 5 µm or less in a major axis direction.

[12] The positive electrode active material according to [11], wherein the nucleus is formed of at least one selected from the group consisting of a titanium compound, an iron compound, and graphite.

[13] A positive electrode comprising the positive electrode active material according to [11] or [12].

[14] A secondary battery comprising a positive electrode according to [13], which is a lithium ion secondary battery or a magnesium secondary battery.

The positive electrode active material of the present invention, which is a positive electrode active material for a magnesium secondary battery or a lithium ion secondary battery, includes a nucleus and a vanadium oxide having a maximum length of 5 µm or less in the major axis direction grown from the nucleus. Therefore, the positive electrode has a high battery capacity.

The positive electrode active material is produced at a high yield by a method of mixing a nucleation material solution in which a nucleation material is dissolved or dispersed, and a solution containing a vanadium compound to form a mixed solution; adjusting the mixed solution to be acidic; and then precipitating vanadium oxide starting from the nucleus by precipitating the nucleus in the mixed solution.

The positive electrode active material is produced at a high yield by a method of mixing a nucleation material solution in which a nucleation material is dissolved or dispersed, and a solution containing a vanadium compound to form a mixed solution; adjusting the mixed solution to be acidic; and then precipitating vanadium oxide from the nucleation material dispersed in the mixed solution.

A magnesium secondary battery having a positive electrode containing the positive electrode active material of the present invention has a high cycle retention rate.

The lithium ion secondary battery having the positive electrode containing the positive electrode active material of the present invention has high rate characteristics.

DETAILED DESCRIPTION OF THE INVENTION

Figure 1:
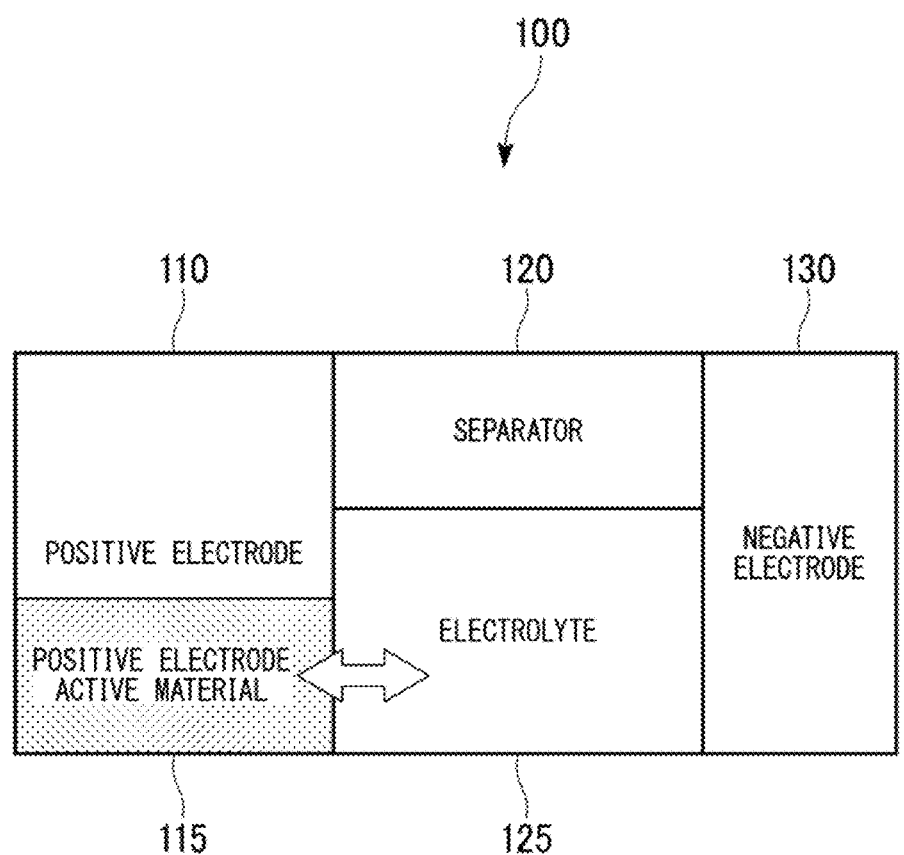
FIG. 1 is a schematic diagram for explaining an example of a secondary battery 100 of the present embodiment.

In order to solve the above-mentioned problems, the present inventors have made intensive studies as described below.

The present inventor paid attention to a magnesium secondary battery using a crystal of vanadium oxide as a positive electrode active material, and examined the reason why the battery capacity and the cycle retention of the positive electrode were insufficient.

As a result, in the secondary battery, magnesium ions having low diffusivity are inserted from the long-axis end of the crystal of vanadium oxide as the positive electrode active material. Therefore, it was found that when the vanadium oxide crystal was excessively grown, magnesium ions cannot be inserted into the vanadium oxide crystal.

The reason why sufficient rate characteristics could not be obtained with a lithium ion secondary battery using vanadium oxide crystals as the positive electrode active material was also examined.

As a result, it was speculated that if the vanadium oxide crystal was excessively grown, the diffusivity of lithium ions in the vanadium oxide crystal would be insufficient.

Therefore, the present inventors have studied to suppress the growth of the vanadium oxide crystal. As a result, it has been found that the vanadium oxide crystals may be precipitated by a method including: obtaining a mixed solution by mixing a nucleation material solution in which a nucleation material is dissolved or dispersed, and a vanadium compound solution; making the mixed solution acidic; and precipitating a vanadium oxide by precipitating nuclei in the mixed solution and precipitating the vanadium oxide from the nuclei as a starting point, or precipitating a vanadium oxide starting from a nucleation material dispersed in the mixed solution.

When a crystal of a vanadium oxide is grown starting from a nucleus in the above acidic solution, the growth of the crystal is hindered, and particles including a crystal which includes a nucleus and a vanadium oxide having a maximum length of 5 μm or less in the major axis direction starting from the nucleus are formed. The vanadium oxide crystal forming these particles has a maximum length of 5 μm or less in the major axis direction, and is easier to insert and remove ions than a crystal containing a crystal having a maximum length of 5 μm or more in the major axis direction. Therefore, the magnesium secondary battery and the lithium ion secondary battery using the particles as the positive electrode active material have the rate characteristics and the cycle retention rate of the positive electrode higher than secondary batteries in which a crystal having a maximum length exceeding 5 μm in the major axis direction is used as the positive electrode active material.

In this embodiment, "maximum length in the major axis direction starting from the nucleus" in the crystal of the vanadium oxide refers to the maximum length in the major axis direction of the crystal when the surface of the positive electrode active material is observed arbitrarily using a scanning electron microscope (SEM).

In addition, vanadium oxide crystals are precipitated starting from the nucleus in the acidic solution containing the nucleation material, so that particles having a size that can be easily collected are obtained. In addition, when vanadium oxide crystals are precipitated starting from nuclei in an acidic solution containing a nucleation material, particles can be produced with a high yield of 50% or more.

On the other hand, for example, when a vanadium oxide crystal is precipitated in an acidic solution containing no nucleation material at a temperature of 50° C. or more and less than 80° C., the crystal growth can be prevented, but the vanadium oxide crystal has a small size and is difficult to recover. Further, since the precipitation of the vanadium compound in the acidic solution is not sufficient, the yield is about 30%.

Next, embodiments of the positive electrode active material, the method for producing the positive electrode active material, the positive electrode, and the secondary battery of the present invention will be described in detail.

"Positive Electrode Active Material"

The positive electrode active material of this embodiment is a positive electrode active material for a magnesium secondary battery or a lithium ion secondary battery. The positive electrode active material of the present embodiment is particles including a nucleus and a crystal of vanadium oxide grown from the nucleus as a starting point. Growth of the vanadium oxide crystal is suppressed so that the maximum length in the major axis direction is 5 µm or less. In this embodiment, since the maximum length of the crystal of the vanadium oxide in the major axis direction is 5 µm or less, the positive electrode active material into which ions are easily inserted and desorbed is obtained. Therefore, a magnesium secondary battery using these particles as a positive electrode active material has a high positive electrode battery capacity and high cycle retention. Further, the maximum length of the vanadium oxide crystal in the major axis direction is preferably 50 nm or more. When the maximum length in the major axis direction of the crystal of the vanadium oxide is 50 nm or more, the vanadium oxide does not become too small, and ions are easily inserted and desorbed into the positive electrode active material, which is preferable.

The crystal of the vanadium oxide is preferably a crystal of ammonium vanadate.

The nuclei forming the particles include those containing a transition metal such as titanium and iron, and carbon, and are preferably formed of at least one selected from titanium compounds, iron compounds and graphite. Particles having a nucleus formed of at least one selected from the group consisting of a titanium compound, an iron compound, and graphite are preferable because they can be easily produced.

"Production method of positive electrode active material"

The positive electrode active material of the present embodiment can be produced, for example, by the following manufacturing method.

First, a solution of a nucleus material in which a nucleation material is dissolved or dispersed and a solution containing a vanadium compound are mixed to form a mixed solution (step (1)).

Next, the mixed solution is adjusted to be acidic (step (2)).

Subsequently, crystals of vanadium oxide are precipitated (precipitation step (3)).

The nucleation material contained in the nucleation material solution in which the nucleation material is dissolved or dispersed is preferably at least one selected from the group consisting of a titanium compound, an iron compound, and graphite.

As the nucleation material solution in which the nucleation material is dissolved or dispersed, for example, an aqueous solution of titanium sulfate when using a titanium compound as the nucleus, an aqueous solution of iron sulfate when using an iron compound as the nucleus, and a graphite dispersion aqueous solution when using carbon as the nucleus, for example, may be used.

Examples of the solutions containing the vanadium compound include an aqueous solution obtained by adding a vanadium oxide to an alkaline aqueous solution such as a sodium hydroxide aqueous solution or ammonia solution and dissolving the same.

In the present embodiment, it is preferable that the mixed solution, which is obtained by mixing the nucleation material solution and the solution containing the vanadium compound, contains a cation. By containing the cation in the mixed solution, the crystal growth of the vanadium oxide is promoted. Examples of the cations include an ammonium ion, a copper ion, and an iron ion. The method for adding the cation to the mixed solution is not particularly limited, but it is preferable to mix the mixed solution and a solution in which the cation is dissolved.

Examples of the solutions in which the cation is dissolved include an ammonium fluoride aqueous solution sulfate, an aqueous solution of ammonium fluoride, an aqueous solution of copper sulfate, and an aqueous solution of iron sulfate.

In the present embodiment, the mixed solution preferably contains a carbonate compound. When a solution containing a carbonate compound is used as the mixed solution, the yield of vanadium oxide is improved. This effect is particularly effective when the precipitation step is performed at a low temperature of, for example, 50 to 80° C.

As the carbonate compound, it is preferable to use at least one selected from the group consisting of sodium carbonate, ammonium carbonate, potassium carbonate, lithium carbonate, sodium hydrogencarbonate, ammonium hydrogencarbonate, and potassium hydrogencarbonate, and it is particularly preferable to use sodium carbonate.

The carbonate compound may be contained in the nucleation material solution or may be contained in the solution containing the vanadium compound. The carbonate compound may be added to a mixed solution obtained by mixing the nucleation material solution and the vanadium compound solution.

In the present embodiment, the mixed solution is adjusted to be acidic. When the mixed solution is adjusted to be acidic, the pH is adjusted to an appropriate pH according to the material used as the nucleus by using a conventionally known method. Specifically, it is adjusted to an appropriate pH using an acid such as sulfuric acid, or an alkali such as a sodium hydroxide aqueous solution and ammonia solution.

When a titanium compound is used as the nucleus, the pH of the acidic solution is preferably adjusted to 3 or less. When an iron compound is used as the nucleus, the pH of the acidic solution is preferably 5 to 6. When carbon such as graphite is used as the nucleus, the pH of the acidic solution is preferably 3 or less.

Next, in the present embodiment, as the precipitation step (3), a step of precipitating nuclei in the mixed solution while stirring and warming to precipitate vanadium oxide starting from the nuclei (3a) or a step of precipitating vanadium oxide starting from the nucleation material dispersed in the mixed solution while stirring and warming (3b) is performed.

When the nucleation material is dissolved in the mixed solution, the step (3a) is performed as a precipitation step. When the nucleation material is dispersed in the mixed solution, the step (3b) is performed as a precipitation step.

The precipitation step (3) is preferably performed at a temperature of 50 to 100° C. By performing the precipitation step (3) within the above temperature range, particles, which contain vanadium oxide crystals having a length of 5 μm or less in the major axis direction starting from the nucleus, can be precipitated at a higher yield.

In the precipitation step (3), the mixed solution for precipitating the vanadium oxide is preferably maintained at a temperature in the range of 50 to 100° C. In order to further improve the yield of the vanadium oxide, the temperature is more preferably maintained in the range of 60 to 95° C., and particularly preferably maintained in the temperature range of 70 to 90° C.

In the present embodiment, the precipitated vanadium oxide crystals are preferably filtered, washed, and dried.

Then, in the present embodiment, it is preferable that the precipitated vanadium oxide crystal is fired at a temperature of 260 to 315° C. In this embodiment, the firing temperature is more preferably 270 to 310° C., and even more preferably 280 to 305° C.

When the firing temperature is 260° C. or higher, water existing between layers of the vanadium oxide can be sufficiently removed. The growth of the vanadium oxide crystals precipitated in the present embodiment is suppressed even when fired at a temperature of 260° C. or higher. On the other hand, if the firing temperature is 320° C. or higher, crystal growth of vanadium pentoxide may occur.

If water exists between the layers of the vanadium oxide crystals precipitated in the precipitation step (3), the negative electrode may be deteriorated in a secondary battery using the vanadium oxide crystals as a positive electrode active material. When the vanadium oxide crystal is fired, water present between the layers of the vanadium oxide is removed. Therefore, in a secondary battery using a crystal of vanadium oxide as a positive electrode active material, deterioration of the negative electrode caused by reaction with water contained in the positive electrode can be suppressed.

"Secondary Battery"

The secondary battery of the present embodiment includes a positive electrode including any of the positive electrode active materials of the present embodiment. The secondary battery may be a lithium ion secondary battery or a magnesium secondary battery.

FIG. 1 is a schematic diagram for explaining an example of the secondary battery 100 of the present embodiment. The secondary battery 100 shown in FIG. 1 includes a positive electrode 110, a separator 120, and a negative electrode 130.

The separator 120 separates the positive electrode 110 and the negative electrode 130. Further, the separator 120 has a liquid retaining ability and holds an electrolyte 125. Thereby, the separator 120 maintains the ionic conductivity between the positive electrode 110 and the negative electrode 130.

As the electrolyte 125, an electrolyte generally used for an aqueous battery or a non-aqueous battery can be used. The electrolyte 125 contains a cation. Examples of the cations in the electrolyte solution 125 include a magnesium ion and a lithium ion.

As a material of the negative electrode 130, for example, magnesium, lithium, or the like can be used.

The positive electrode 110 has a positive electrode current collector (not shown) and a positive electrode active material layer 115 formed on the positive electrode current collector. The positive electrode current collector constitutes the positive electrode 110 together with the positive electrode active material layer 115, and supplies electrons to the positive electrode active material during discharging.

The positive electrode active material layer 115 includes a positive electrode active material, a binder, and a conductive agent. As the positive electrode active material, the positive electrode active material of the above-described embodiment may be used.

As the binder, a non-aqueous binder such as polyvinylidene fluoride (PVDF) and polytetrafluoroethylene (PTFE) may be used.

As the conductive agent, for example, a carbon material such as graphite, carbon black, and acetylene black may be used.

The positive electrode 110 can be formed by, for example, applying a slurry obtained by mixing a positive electrode active material, a binder, a conductive agent, and a solvent onto a positive electrode current collector and drying the slurry. As the solvent, for example, N-methyl-2-pyrrolidone (NMP), methyl ethyl ketone, dimethylformamide and the like can be used.

The secondary battery 100 of the present embodiment can be produced by a conventionally known method.

EXAMPLE

Hereinafter, the present invention will be described more specifically with reference to Examples and Comparative Examples. In addition, this invention is not limited only to the following Examples.

Example 1

A mixed solution was prepared by mixing a nucleation material solution shown below in which the nucleation material was dissolved, a solution containing the following vanadium compound, and a solution in which the following cations were dissolved.

Next, the mixed solution was adjusted to an acidic pH of 2 using sulfuric acid to obtain an acidic solution. Thereafter, the acidic solution was maintained at a temperature of 70° C. for 20 minutes or more with stirring, and nuclei were precipitated in the acidic solution, and vanadium oxide was precipitated starting from the nuclei.

Next, the precipitated vanadium oxide crystals were filtered, washed, dried, and fired at a temperature of 295° C.

The positive electrode active material of Example 1 was obtained by the above steps.

The yield of the positive electrode active material of Example 1 was 90%.

The yield was calculated by the following equation.

$$\text{Yield}(\%) = \{\text{Recovered Amount}(g)/\text{Theoretical Synthesis Amount}(g)\} \times 100$$

Figure 23A:
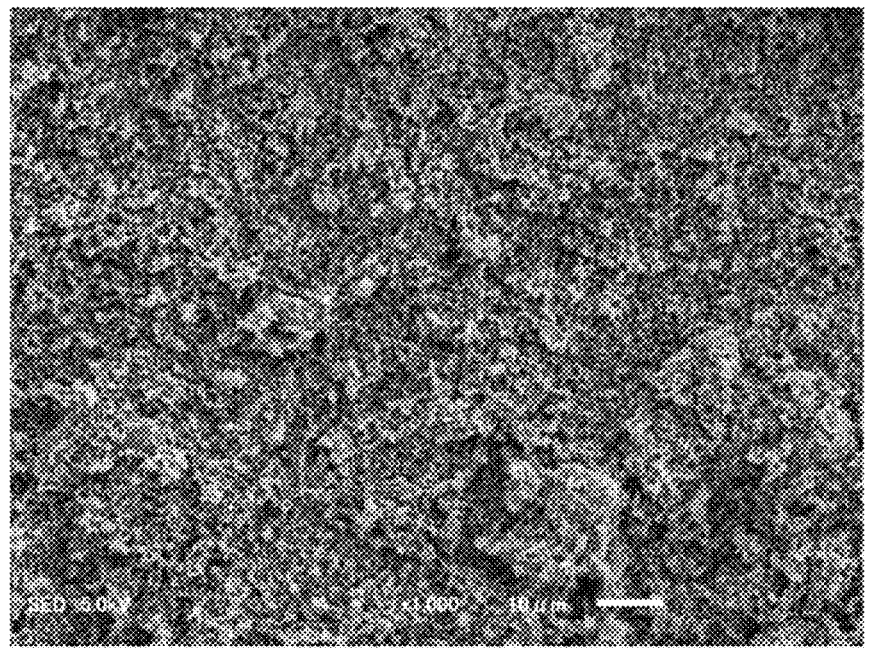
FIG. 23A is a scanning electron micrograph of Example 1 (Experimental example 7).
Figure 23B:
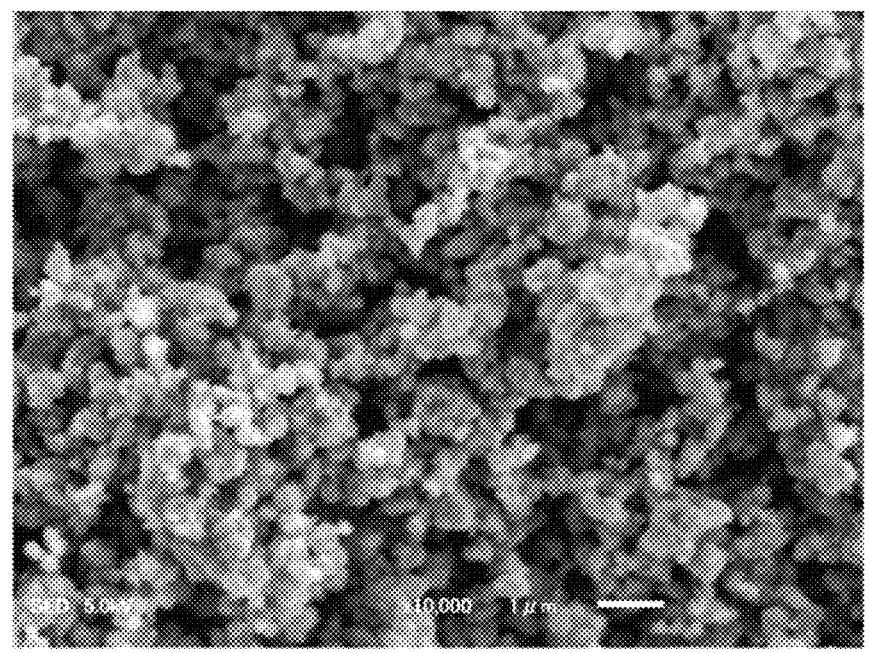
FIG. 23B is a scanning electron micrograph of Example 1 (Experimental example 7).

The positive electrode active material of Example 1 was observed using a scanning electron microscope (SEM). For observation by SEM, the positive electrode active material was fixed on a carbon tape and observed at an acceleration voltage of 5 kV. The results are shown in FIGS. 23A and 23B. FIG. 23A and FIG. 23B are scanning electron micrographs of the positive electrode active material of Example 1. The image of FIG. 23B is an enlarged view of a part of the image of FIG. 23A.

As shown in FIG. 23B, the positive electrode active material of Example 1 was a particle including a nucleus and a crystal of vanadium oxide starting from the nucleus, and the maximum length in the major axis direction of the crystal of vanadium oxide was 5 μm or less.

(Nucleation Material Solution in Which Nucleation Material is Dissolved)
  Titanium sulfate solution (Kanto Chemical Co., Ltd., 40164-10): 32 ml
  Sodium carbonate (37141-00, manufactured by Kanto Chemical Co., Ltd.): 8 g
  Sulfuric acid (198-09595, manufactured by Wako Pure Chemical Industries, Ltd.): 170.08 g
  Pure water: 55.2 g
(Vanadium Compound Solution)
  Ammonium metavanadate ($NH_4VO_3$) (manufactured by Taiyo Mining Co., Ltd.): 25.2 g
  Sodium hydroxide aqueous solution (32 wt %): 13 ml
  Pure water: 600 g
(Solution in Which Cation was Dissolved)
  Ammonium sulfate (manufactured by Kanto Chemical Co., Inc., 01322-00): 98 g
  Sulfuric acid (198-9595, manufactured by Wako Pure Chemical Industries, Ltd.): 170 g
  Pure water: 140 g "Magnesium Secondary Battery"

Using the positive electrode active material of Example 1, a magnesium secondary battery was formed by the following method, and the charge/discharge characteristics were evaluated.

The positive electrode active material of Example 1, acetylene black as a conductive agent, and polyvinylidene fluoride (PVDF) as a binder were used at a mass ratio of 8:1:1, and were mixed with N-methyl-2-pyrrolidone (NMP) which was used as a solvent to form a slurry. The obtained slurry was applied to carbon paper as a positive electrode current collector, and dried at 130° C. to obtain a positive electrode.

A magnesium ribbon was used as the negative electrode.

As the electrolyte, an electrolyte composed of triethylene glycol dimethyl ether (trade name: Triglyme, manufactured by Sankyo Chemical Co., Ltd.), which contains 0.3 mol/l of magnesium trifluoromethanesulfonylamide and 0.6 mol/l of succinic anhydride, was used.

The magnesium secondary battery of Example 1 was obtained by installing the positive electrode, the negative electrode, and the electrolyte in a sealed beaker cell under an argon atmosphere.

The obtained magnesium secondary battery was set in a charging/discharging device (TOSCAT3100: manufactured by Toyo System Co., Ltd.) and a charge/discharge test was repeated multiple times (five times in FIG. 2) at a temperature of 35° C., a capacity of 300 mAh/g, and a charging/discharging rate of 0.1 C. As a result, the relationship between the capacity of the positive electrode material and the voltage (charge/discharge curve) was examined. The results are shown in FIG. 2.

Figure 2:
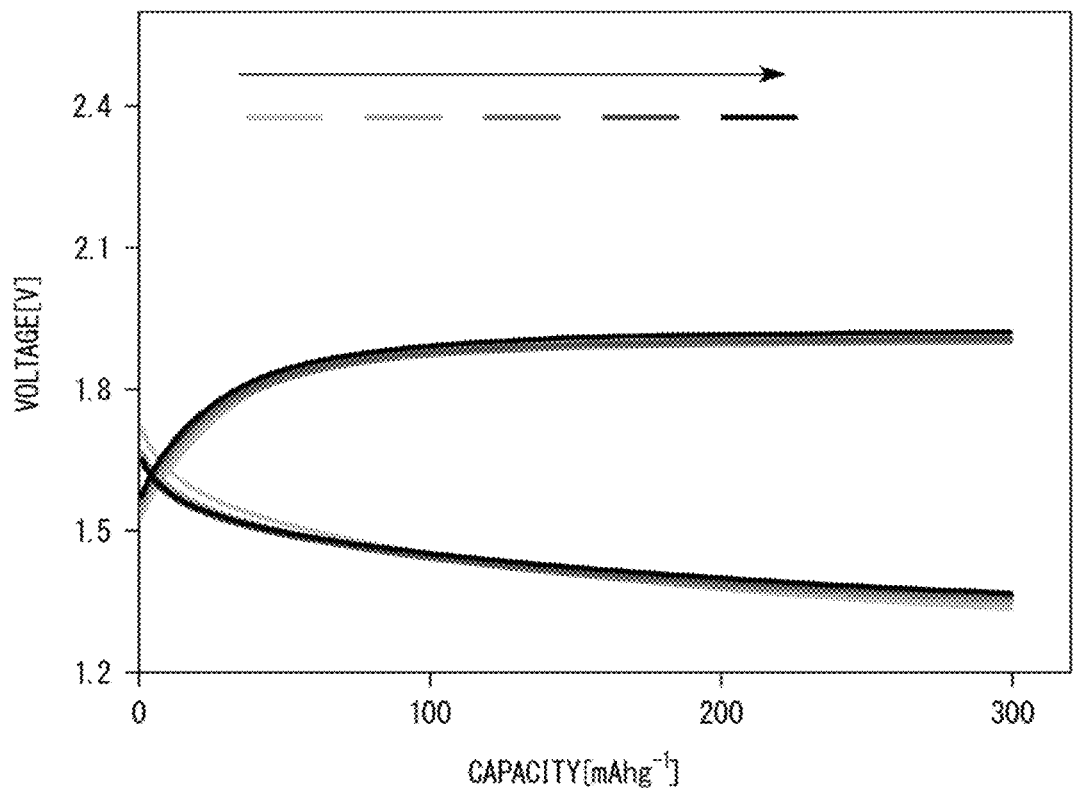
FIG. 2 is a graph showing the relationship between the capacity and voltage of a positive electrode material in a magnesium secondary battery formed using the positive electrode active material of Example 1.

The arrow in FIG. 2 indicates the approximate transition direction of the charge/discharge curve with respect to the increase in the number of times of charge/discharge. The arrow described in the graph of the charge/discharge curve in this specification is the same in other drawings. The shade of the line in the graph shown in FIG. 2 indicates the order in which the charge/discharge test was performed. The lighter the color, the earlier the data, and the darker the color, the later the data.

Figure 4:
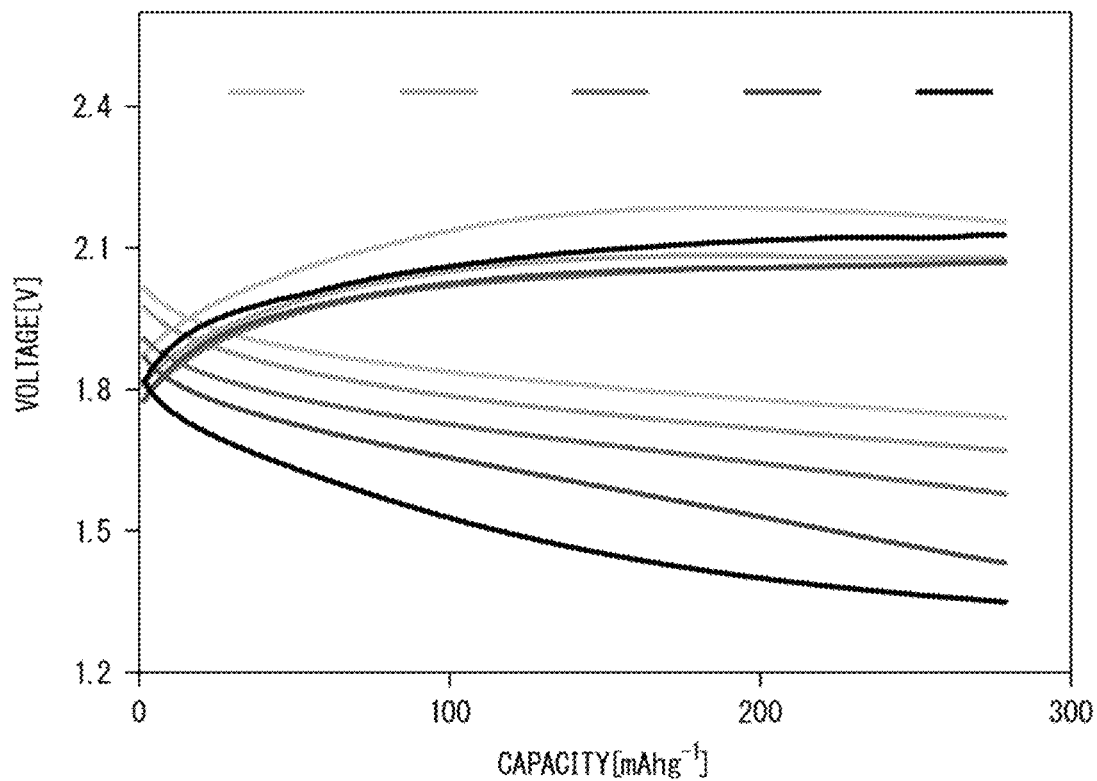
FIG. 4 is a graph showing the relationship between the capacity and voltage of a positive electrode material in a magnesium secondary battery formed using the positive electrode active material of Example 2.
Figure 6:
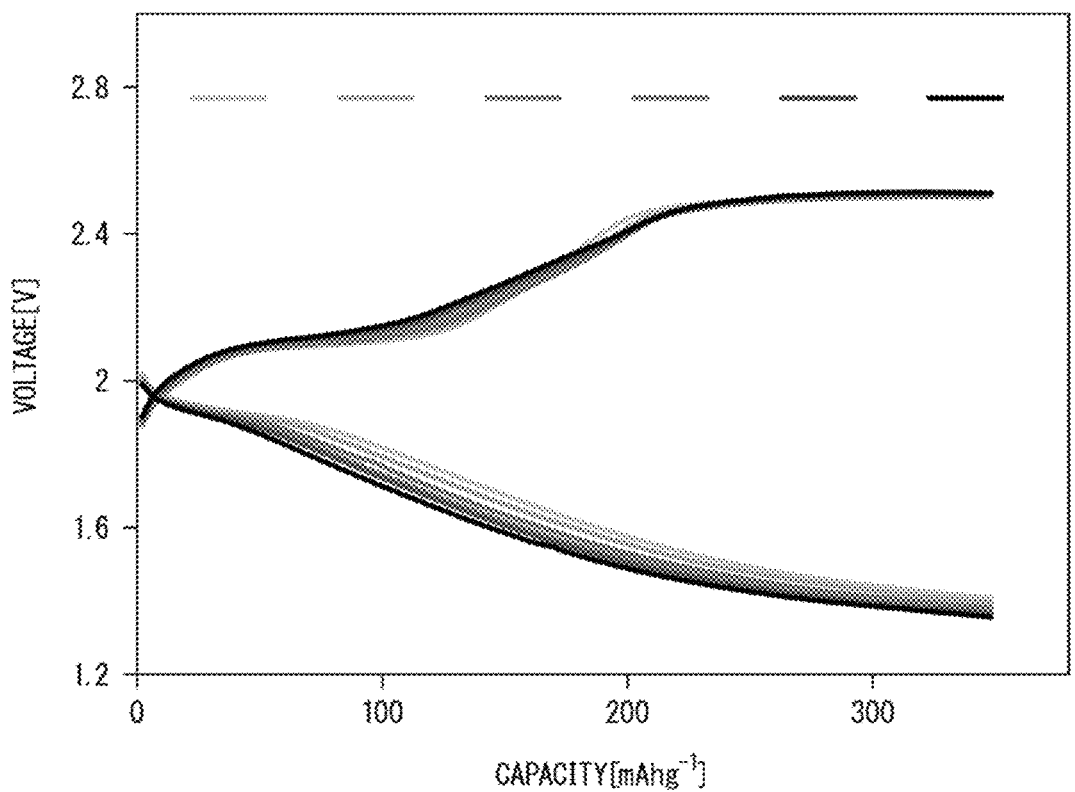
FIG. 6 is a graph showing the relationship between the capacity and voltage of a positive electrode material in a magnesium secondary battery formed using the positive electrode active material of Example 3.
Figure 7:
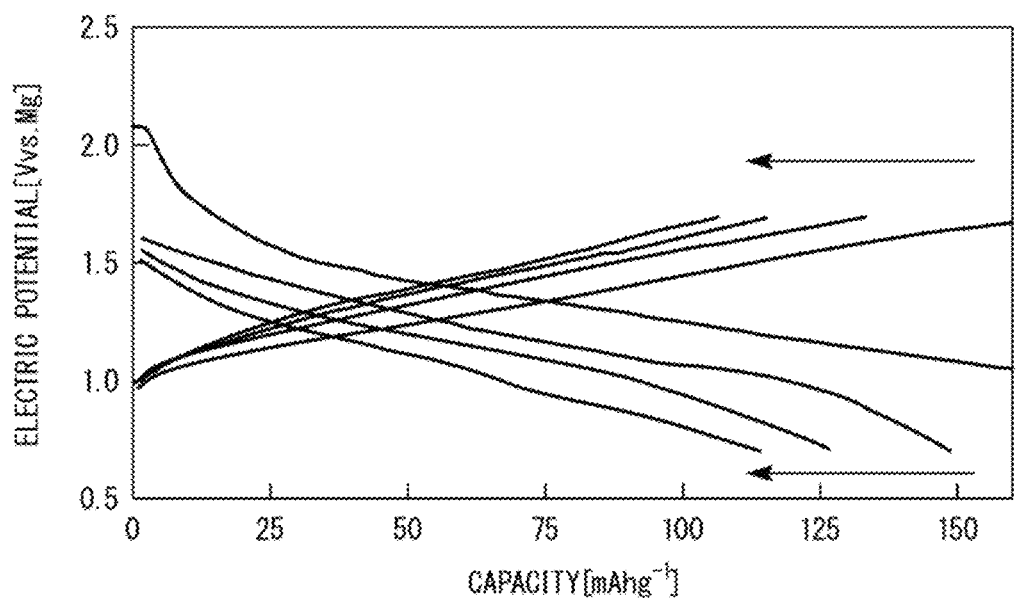
FIG. 7 is a graph showing the relationship between the capacity and the electric potential of a positive electrode material in a magnesium secondary battery formed using the positive electrode active material of Experimental example 6.
Figure 30:
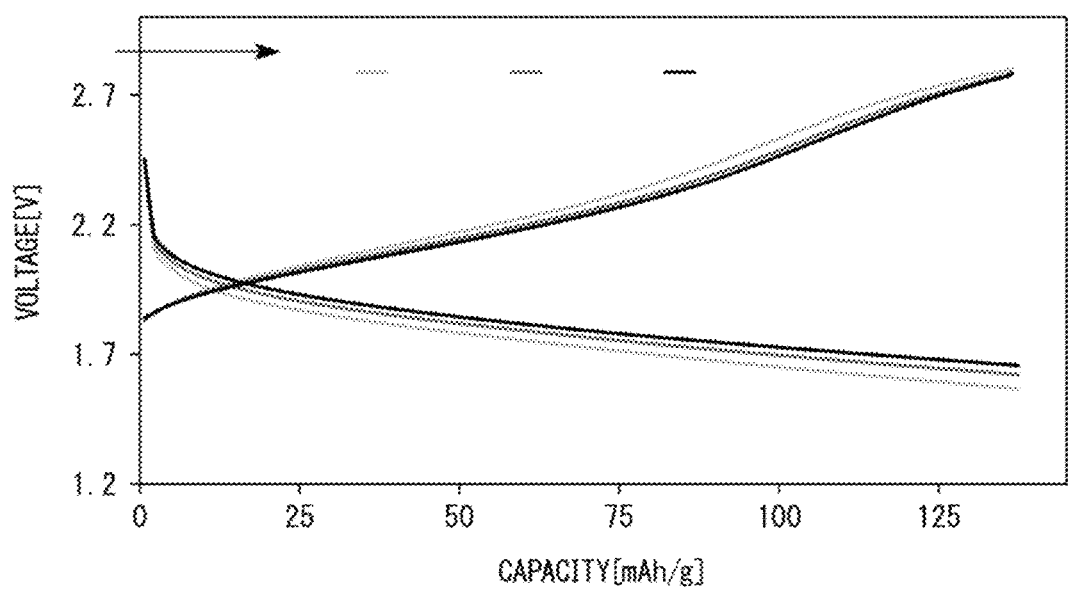
FIG. 30 is a graph showing a relationship between the capacity and voltage of a positive material in a magnesium secondary battery formed using the positive active material of Experimental example 9

The shades of the lines in the graphs shown in FIGS. 4, 6, and 30 also indicate the order in which the charge/discharge tests were performed.

"Lithium Ion Secondary Battery"

Using the positive electrode active material of Example 1, a test cell of a lithium ion secondary battery was formed by the method described below, and the charge/discharge characteristics were evaluated.

The positive electrode active material of Example 1, acetylene black as a conductive agent, and polyvinylidene fluoride (PVDF) as a binder were used at a mass ratio of 8:1:1, and were mixed with N-methyl-2-pyrrolidone (NMP) as a solvent to form a slurry.

A roughened aluminum foil (manufactured by JAPAN CAPACITOR INDUSTRIAL Co., Ltd.) having a length of 20 mm, a width of 31 mm and a thickness of 30 µm was prepared as a positive electrode current collector. Then, the slurry was applied to a region of 20 mm in length and 20 mm in width from one end in the horizontal direction of the positive electrode current collector, and dried at 130° C. to form a positive electrode active material layer, thereby obtaining a positive electrode.

As the negative electrode, a metal lithium plate having a length of 20 mm, a width of 31 mm, and a thickness of 400 µm was used.

As the separator, a commercially available separator for a lithium ion battery including a laminate of a polyethylene (PE) film and a polypropylene (PP) film was used.

As an electrolyte, 1 mol/L of lithium hexafluorophosphate ($LiPF_6$) was mixed in a solution obtained by mixing ethylene carbonate (EC) and ethyl methyl carbonate (EMC) at a volume ratio of 3:7 (EC:EMC) (Manufactured by Kishida Chemical Co., Ltd.).

Figure 3:
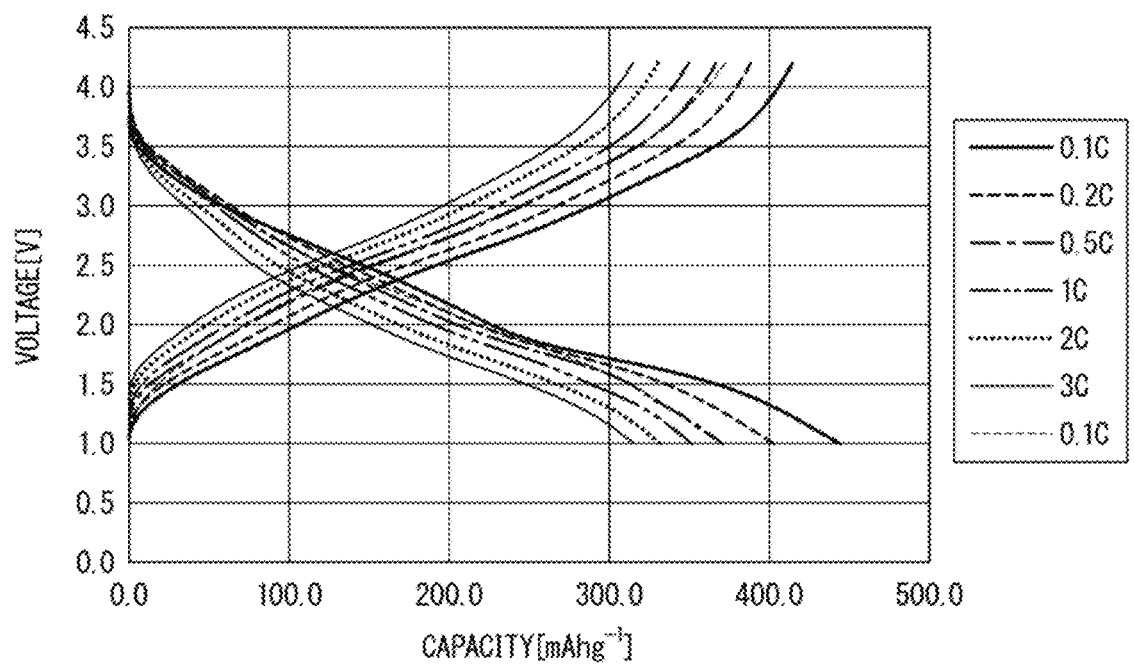
FIG. 3 is a graph showing the relationship between the capacity and voltage of a positive electrode material in a lithium ion secondary battery formed using the positive electrode active material of Example 1.

The above-described negative electrode was disposed in the lower container in the housing portion of the secondary battery test jig described in Patent Document 3, and the separator was disposed so as to cover a region excluding the electrode terminal portion on the negative electrode. Next, the separator was impregnated with the electrolyte. The positive electrode was then arranged such that the positive electrode active material layer overlapped the negative electrode with the separator interposed therebetween. Then, the test cell was formed by covering the upper container of the housing portion and fixing it with bolts, and connecting the electrode terminals of the positive electrode and the negative electrode to external measuring devices (Trade Name: EF-7100P, Manufactured by Electrofield Co., Ltd.), respectively. Then, the relationship between the capacity of the positive electrode material and the voltage when the discharge rate was set to 0.1 C, 0.2 C, 0.5 C, 1 C, 2 C, and 3 C was examined. The result is shown in FIG. 3.

Example 2

A positive electrode active material of Example 2 was obtained in the same manner as in Example 1 except that a nucleation material solution, in which the following nucleation material was dissolved, was used; and a mixed solution was adjusted to be acidic at pH of 6 by using sulfuric acid and a sodium hydroxide aqueous solution.

(Nucleation Material Solution in which Nucleation Material was Dissolved)
  Iron (II) sulfate heptahydrate (16038-01, manufactured by Kanto Chemical Co., Ltd.): 12.6 g
  Pure water: 55.2 g The yield of the positive electrode active material of Example 2 was calculated in the same manner as the positive electrode active material of Example 1. As a result, the yield of the positive electrode active material of Example 2 was 50%.

Figure 28A:
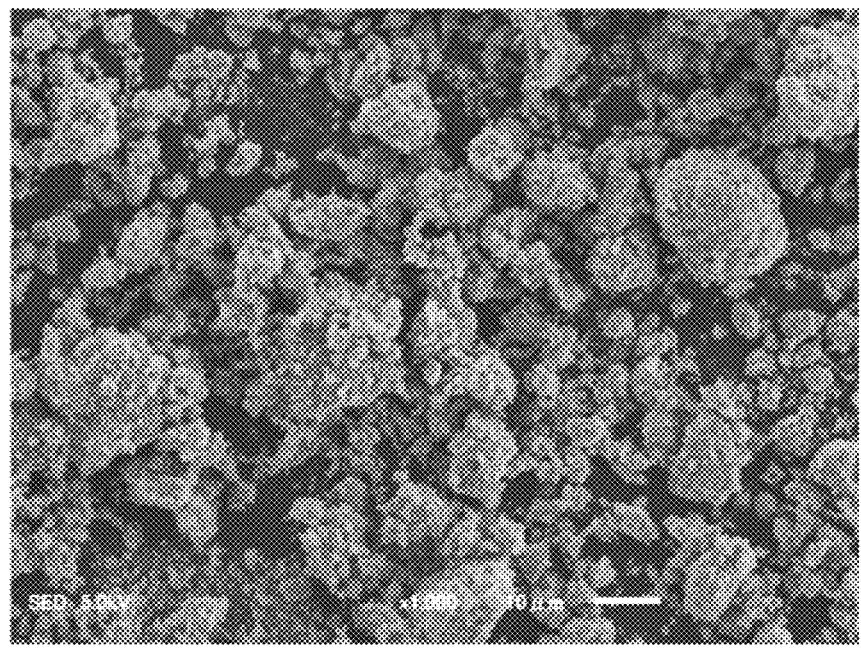
FIG. 28A is a scanning electron micrograph of Example 2.
Figure 28B:
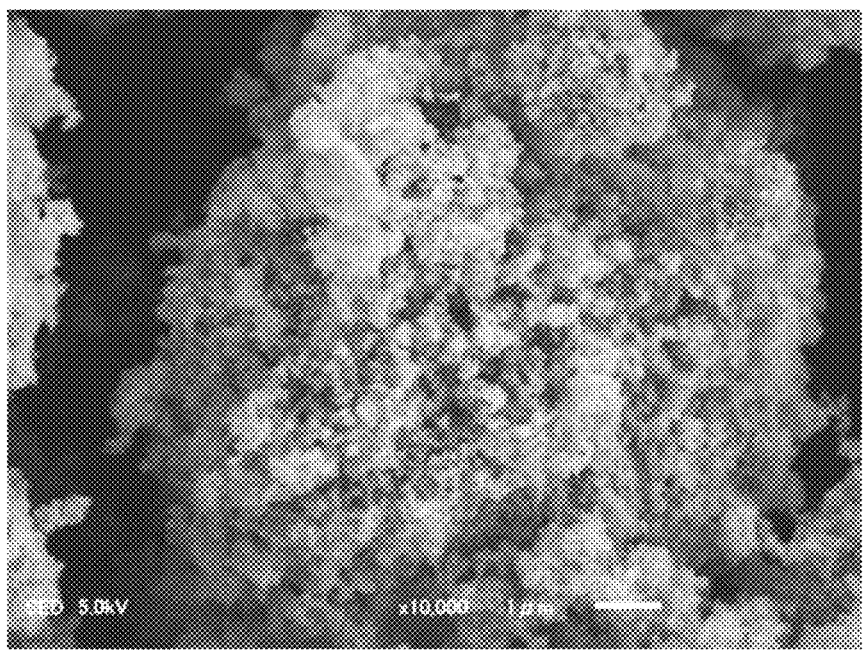
FIG. 28B is a scanning electron micrograph of Example 2.

The positive electrode active material of Example 2 was observed using a scanning electron microscope (SEM) in the same manner as in Example 1. The results are shown in FIGS. 28A and 28B. FIGS. 28A and 28B are scanning electron micrographs of the positive electrode active material of Example 2. The image in FIG. 28B is an enlarged view of a part of the image in FIG. 28A.

As shown in FIG. 28B, the positive electrode active material of Example 2 is a particle including a nucleus and a crystal of vanadium oxide starting from the nucleus, and the crystal has a maximum length of 5 μm or less in the major axis direction of the crystal of vanadium oxide.

"Magnesium Secondary Battery"

A magnesium secondary battery was formed using the positive electrode active material of Example 2 in the same manner as in Example 1, and the charge/discharge characteristics were evaluated. The result is shown in FIG. 4.

"Lithium Ion Secondary Battery"

Figure 5:
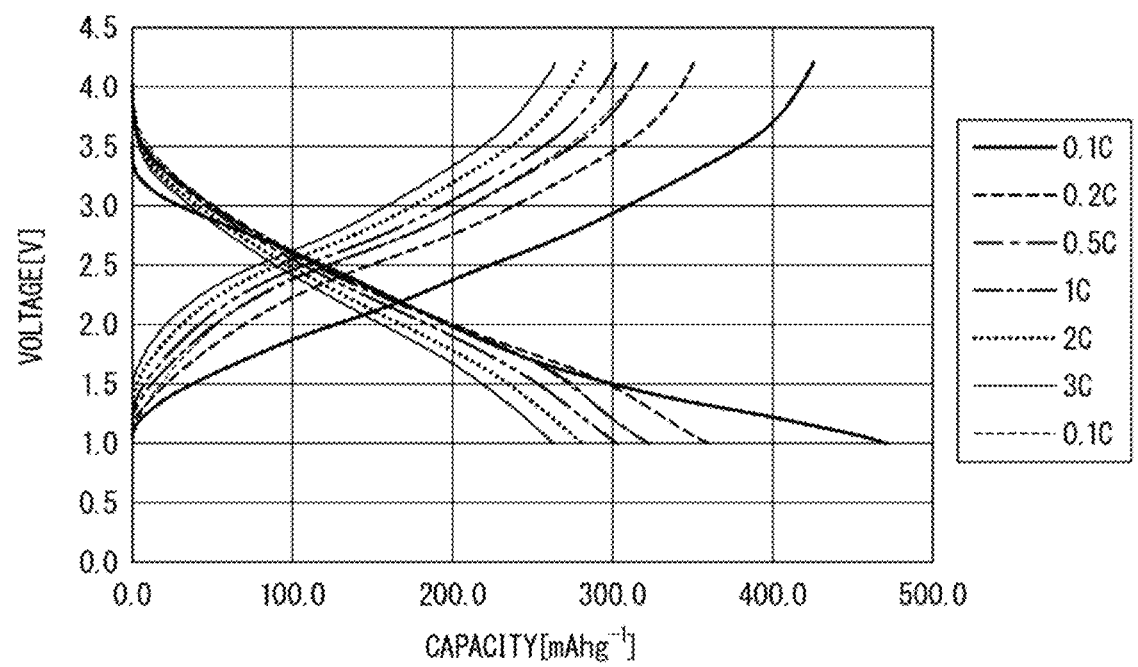
FIG. 5 is a graph showing the relationship between the capacity and voltage of a positive electrode material in a lithium ion secondary battery formed using the positive electrode active material of Example 2.

Using the positive electrode active material of Example 2, a test cell of a lithium ion secondary battery was formed in the same manner as in Example 1, and the charge/discharge characteristics were evaluated. The result is shown in FIG. 5.

Figure 29:
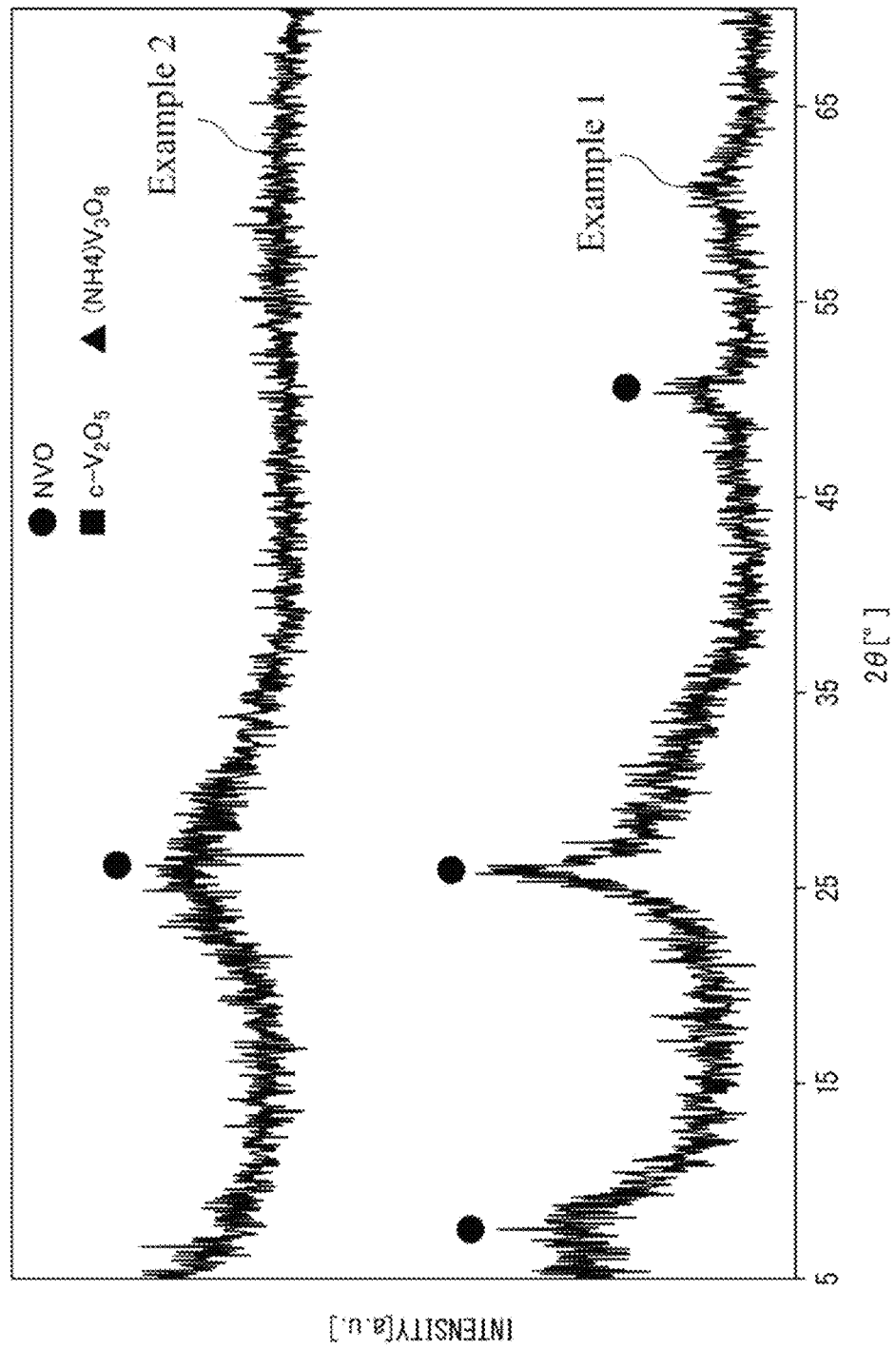
FIG. 29 is a graph showing the results of X-ray diffraction of the positive electrode active materials of Example 1 and Example 2.

The positive electrode active materials of Example 1 and Example 2 were subjected to X-ray diffraction. X-ray diffraction was performed using an X-ray diffractometer (Trade name: JDX-3530: manufactured by JEOL Ltd.) under the conditions of a measurement angle of 5 to 70°, a step angle of 0.04°, and an integration time of 1 second. The results are shown in FIG. 29. In FIG. 29, the horizontal axis is the diffraction angle 2θ, and the vertical axis was the X-ray intensity. The word of "c-$V_2O_5$" in FIG. 29 indicates a crystal of vanadium pentoxide, and "NVO" indicates ammonium vanadate.

As shown in FIG. 29, there was no difference between the positions of the diffraction peaks in the positive electrode active materials of Example 1 and Example 2. Further, from FIG. 29, it was confirmed that in the positive electrode active materials of Example 1 and Example 2, ammonium vanadate crystals were precipitated with high purity.

Example 3

An acidic solution of Example 3 was obtained in the same manner as in Example 1, except that a nucleation material solution, in which the nucleation material shown below was dispersed, was used.

Thereafter, the acidic solution was maintained at a temperature of 60° C., and vanadium oxide was precipitated starting from the dispersed nucleation material.

Next, the precipitated vanadium oxide crystals were filtered, washed, dried, and fired at a temperature of 295° C.

Through the above steps, the positive electrode active material of Example 3 was obtained.

(Nucleation Material Solution in which Nucleation Material was Dispersed)

Graphite (manufactured by Kanto Chemical Co., Ltd.): 0.26 g

Pure water: 55.2 g

The yield of the positive electrode active material of Example 3 was calculated in the same manner as in the positive electrode active material of Example 1. As a result, the yield of the positive electrode active material of Example 3 was 70%.

"Magnesium Secondary Battery"

A magnesium secondary battery was formed using the positive electrode active material of Example 3 in the same manner as in Example 1, and the charge/discharge characteristics were evaluated. The results are shown in FIG. 6.

Comparative Example 1

A positive electrode active material of Comparative Example 1 was obtained in the same manner as in Example 1, except that the nucleation material solution was not included and that the acidic solution was maintained at a temperature of 90° C. to precipitate crystals of vanadium oxide.

Figure 20A:
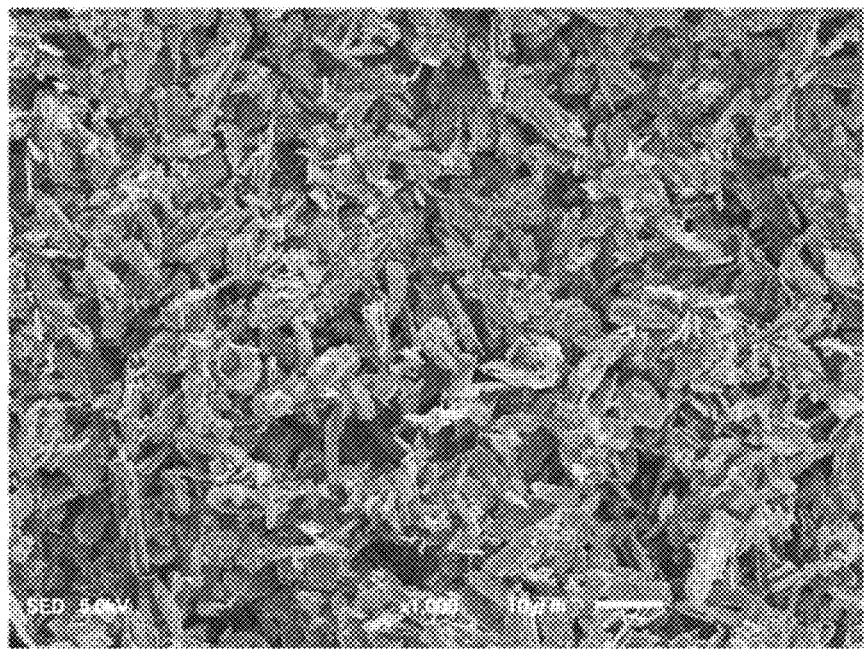
FIG. 20A is a scanning electron micrograph of Comparative Example 1.
Figure 20B:
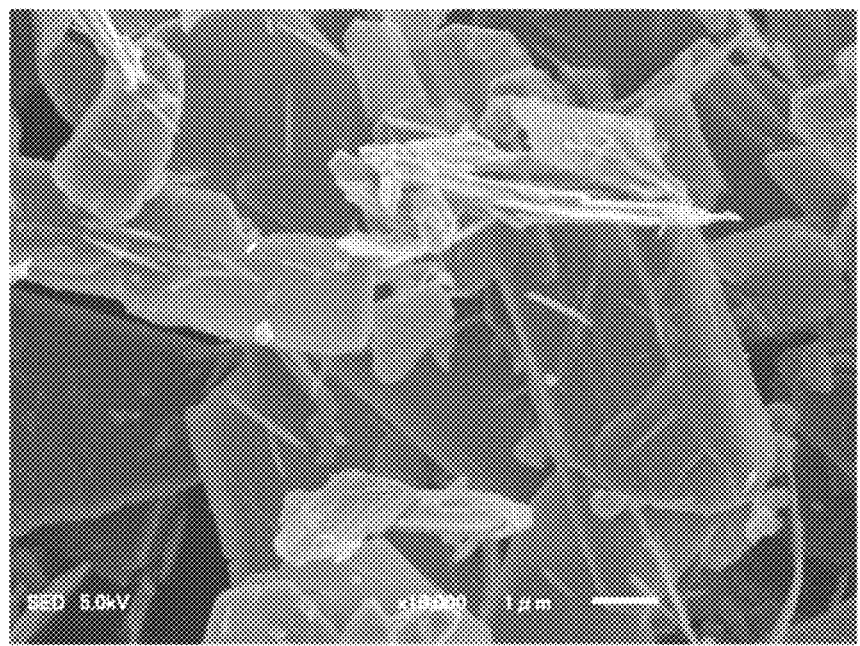
FIG. 20B is a scanning electron micrograph of Comparative Example 1.

The yield of the positive electrode active material of Comparative Example 1 was 85%. Further, the positive electrode active material of Comparative Example 1 was observed using a scanning electron microscope (SEM) in the same manner as in Example 1. The results are shown in FIGS. 20A and 20B. The image of FIG. 20B is an enlarged view of a part of the image of FIG. 20A.

As shown in FIG. 20B, the positive electrode active material of Comparative Example 1 was a positive electrode active material containing a crystal of vanadium oxide which had a maximum length exceeded 5 μm in the major axis direction.

"Lithium Ion Secondary Battery"

Using the positive electrode active material of Comparative Example 1, a test cell of a lithium ion secondary battery was formed in the same manner as in Example 1, and the charge/discharge characteristics were evaluated. The results are shown in FIG. 8.

Figure 8:
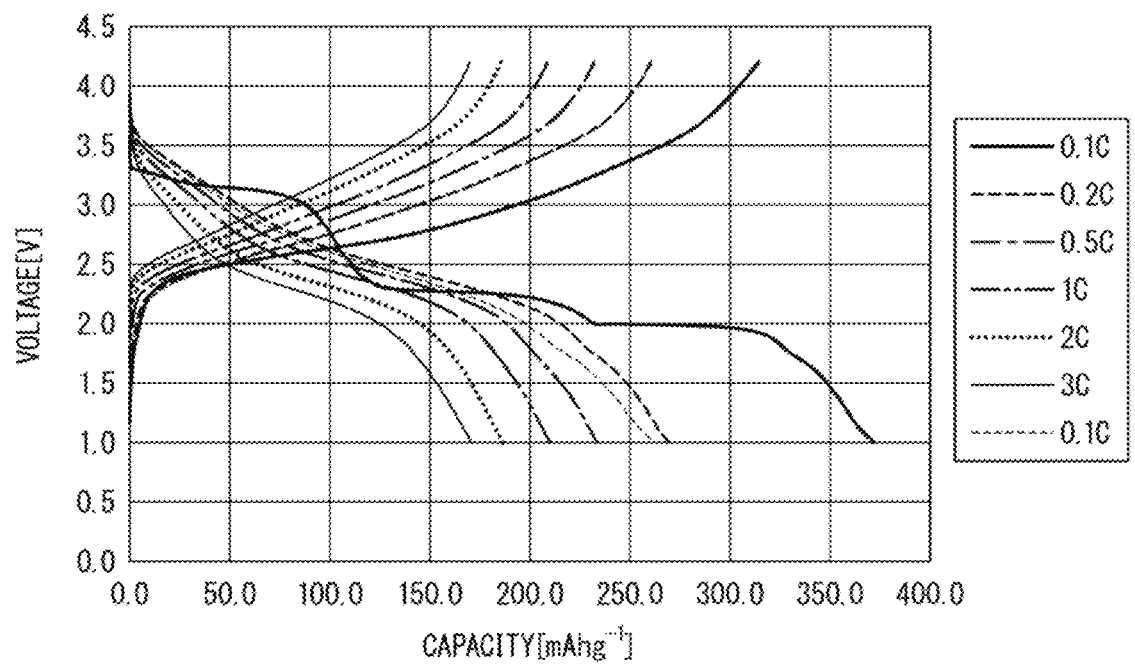
FIG. 8 is a graph showing a relationship between the capacity and voltage of a positive electrode material of a lithium ion secondary battery formed using the positive electrode active material of Comparative Example 1.
Figure 9:
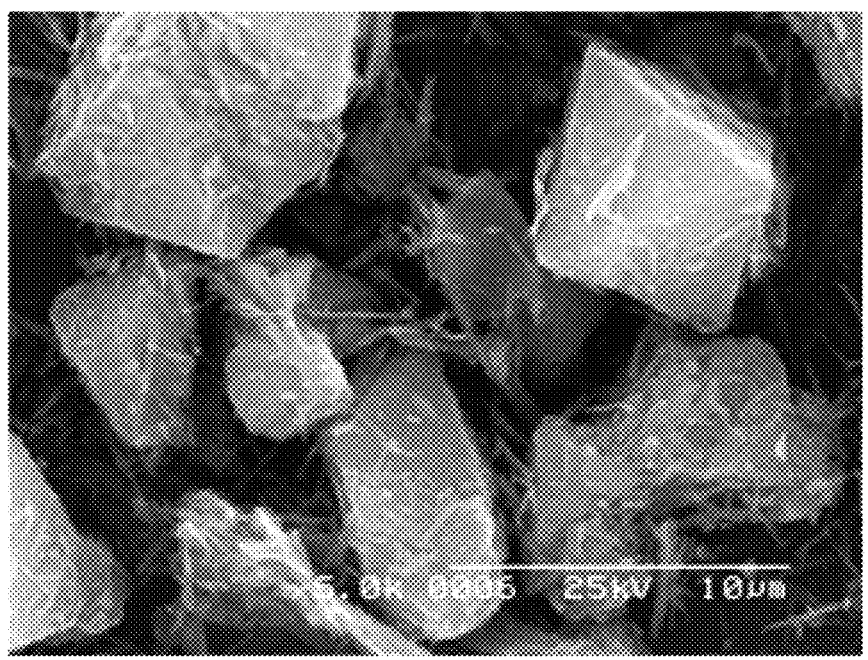
FIG. 9 is a scanning electron micrograph of Experimental example 1.
Figure 10:
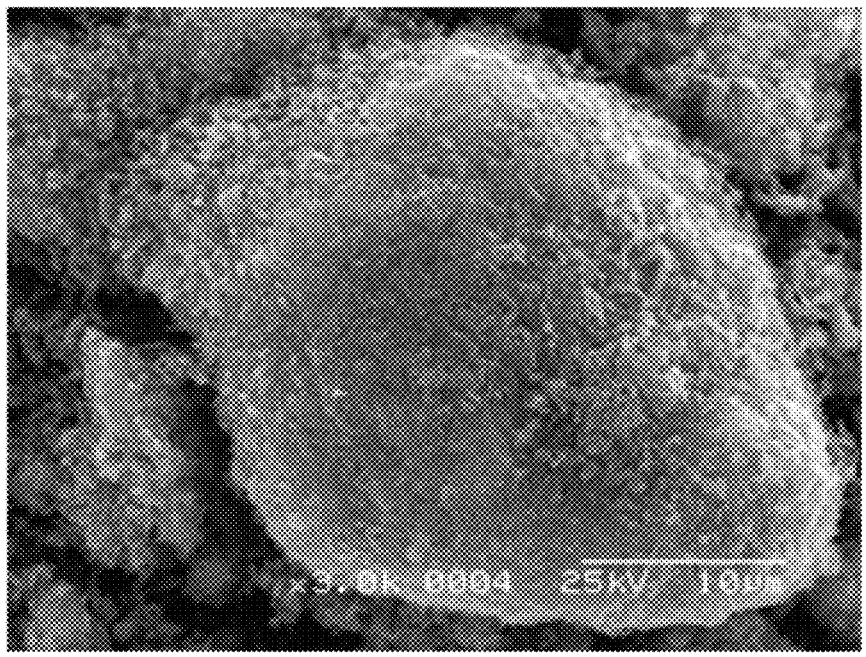
FIG. 10 is a scanning electron micrograph of Experimental example 2.
Figure 11:
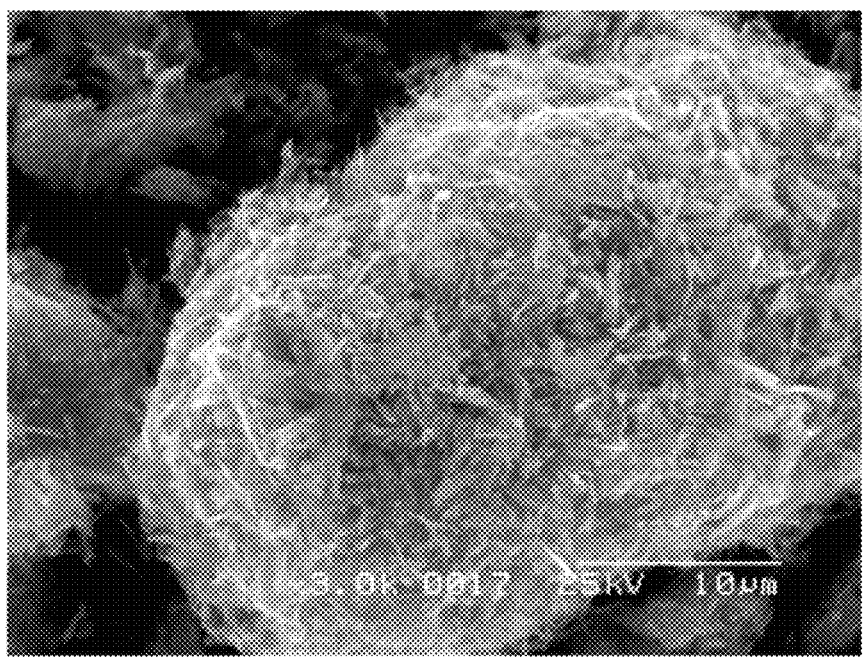
FIG. 11 is a scanning electron micrograph of Experimental example 3.
Figure 12:
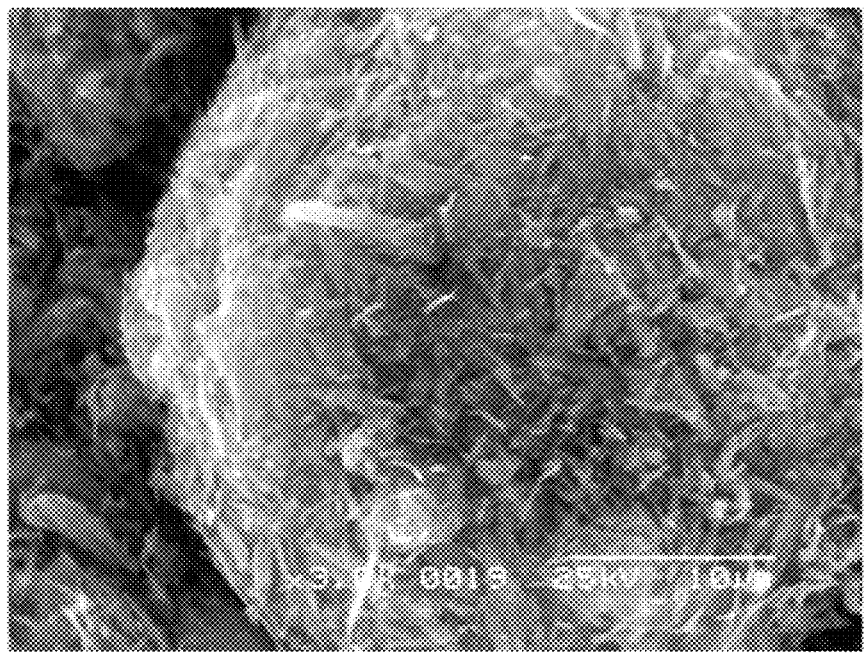
FIG. 12 is a scanning electron micrograph of Experimental example 4.
Figure 13:
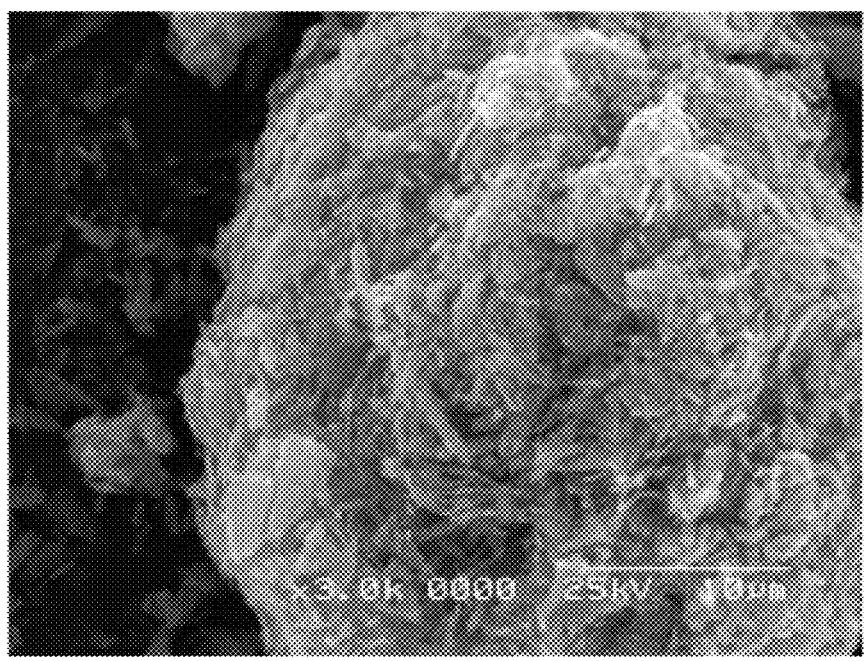
FIG. 13 is a scanning electron micrograph of Experimental example 5.

As shown in FIG. 3, the test cell of the lithium ion secondary battery using the positive electrode active material of Example 1 had a better rate characteristic than the cell using the positive electrode active material of Comparative Example 1, as shown in FIG. 8.

The test cell of the lithium ion secondary battery using the positive electrode active material of Example 2 shown in FIG. 5 also had a better rate characteristics than the cell using the positive electrode active material of Comparative Example 1, as shown in FIG. 8.

Experimental Example 7 to Experimental Example 9

The positive electrode active material of Example 1 in which crystals of vanadium oxide were precipitated at 70° C. was used as the positive electrode active material of Experimental example 7.

Further, the positive electrode active materials of Experimental examples 8 and 9 were obtained in the same manner as in Example 1 except that the temperature of the acidic solution was set at 80° C. (Experimental example 8) or 90° C. (Experimental example 9).

Figure 21:
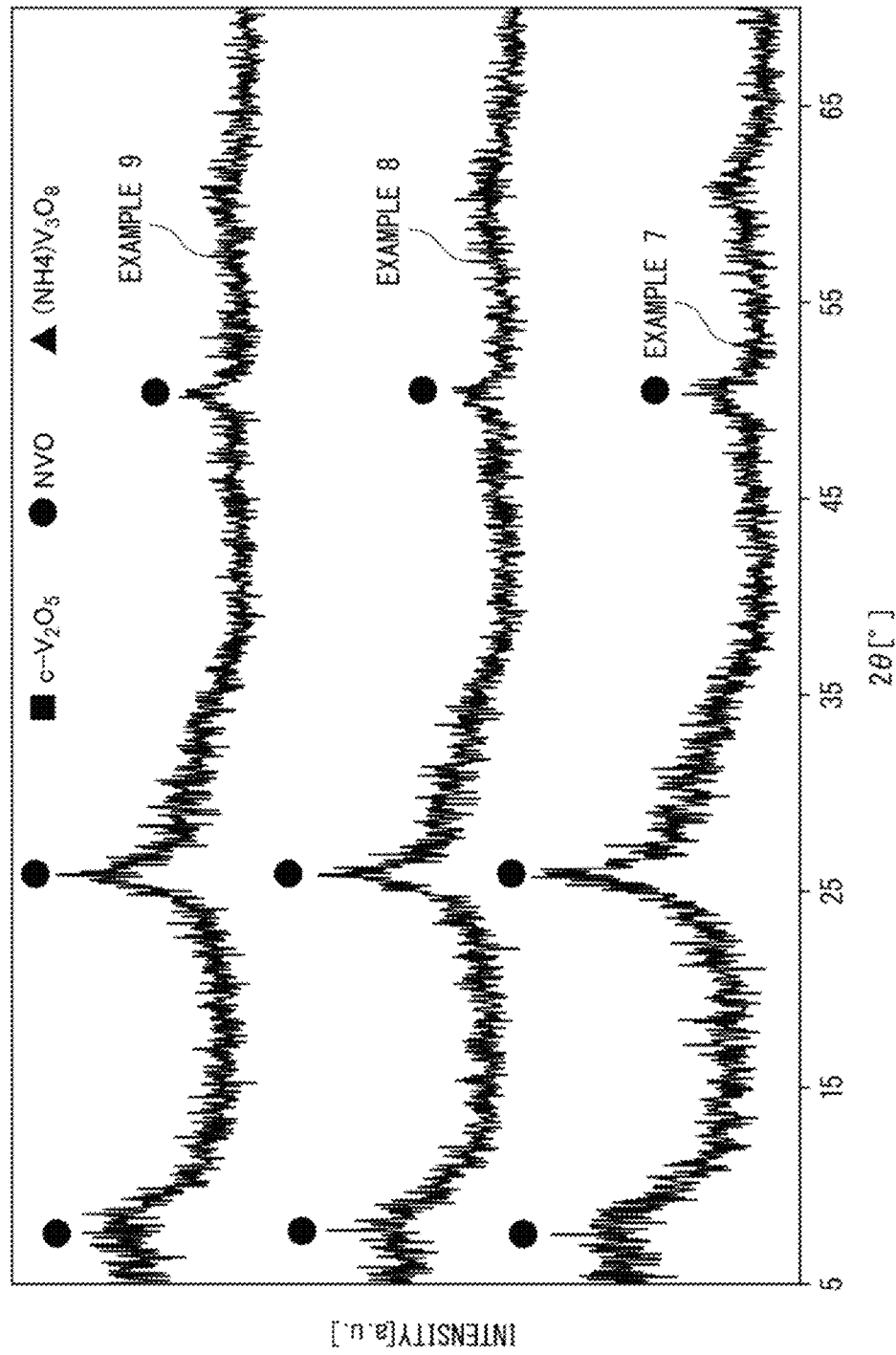
FIG. 21 is a graph showing the results of X-ray diffraction of vanadium oxide crystals in Experimental examples 7 to 9.

X-ray diffraction was performed on the vanadium oxide crystals precipitated in Experimental examples 7 to 9. X-ray diffraction was performed using an X-ray diffractometer (Trade name: JDX-3530: manufactured by JEOL Ltd.) under the conditions of a measurement angle of 5 to 70°, a step angle of 0.04°, and an integration time of 1 second. The results are shown in FIG. 21. In FIG. 21, the horizontal axis was the diffraction angle 2θ, and the vertical axis was the X-ray intensity. "NVO" in FIG. 21 indicates ammonium vanadate, and "c-$V_2O_5$" indicates a crystal of vanadium pentoxide.

As shown in FIG. 21, there was no difference between the diffraction peak positions in the vanadium oxide crystals of Experimental examples 7 to 9. In addition, from FIG. 21, it was confirmed that in Experimental examples 7 to 9, ammonium vanadate crystals were precipitated with high purity.

Figure 22:
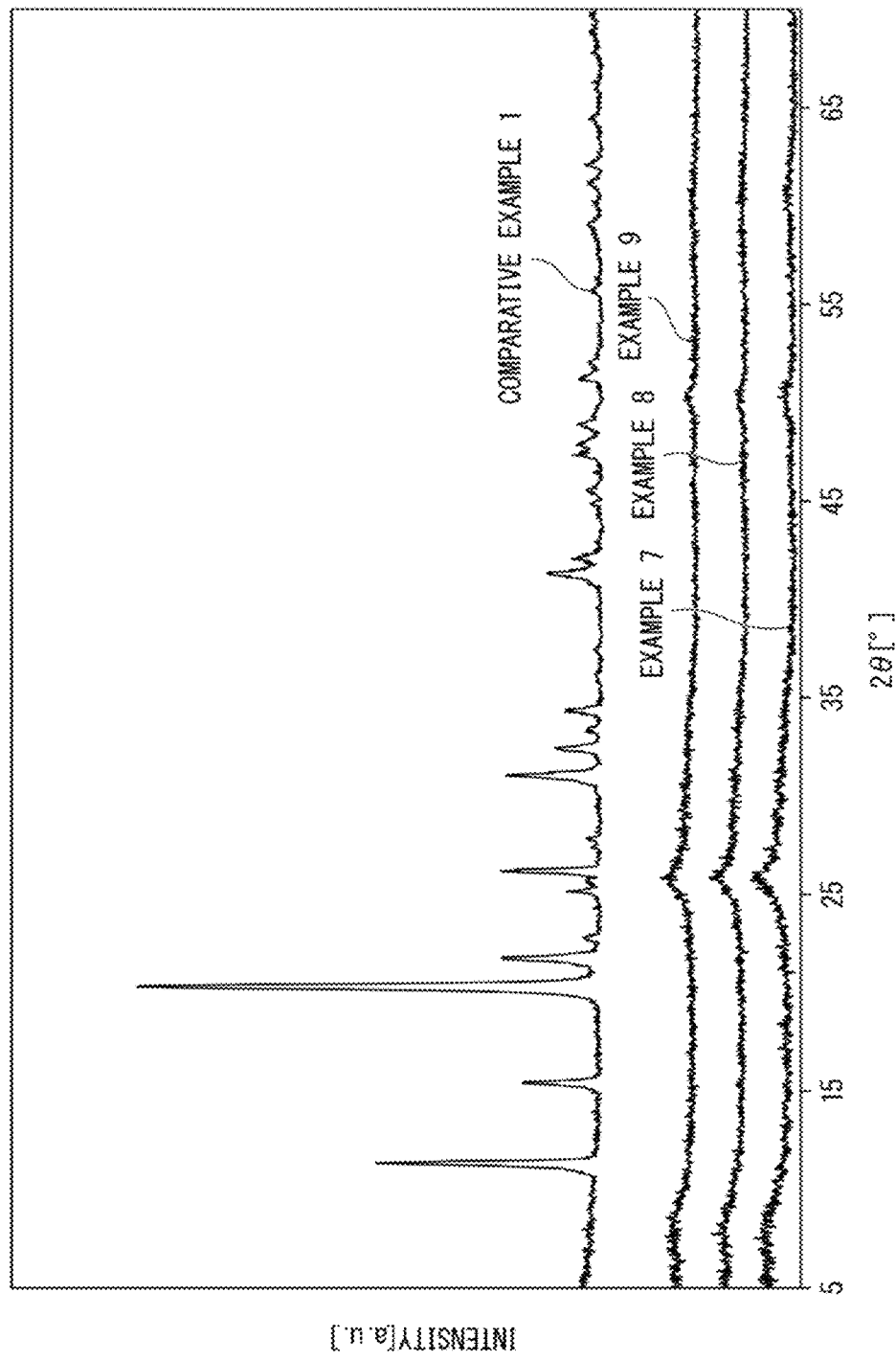
FIG. 22 is a graph showing the results of X-ray diffraction of the vanadium oxide crystals of Experimental examples 7 to 9 and Comparative Example 1.

X-ray diffraction was performed on the vanadium oxide crystals precipitated in Comparative Example 1 in the same manner as in Experimental example 7. The results are shown in FIG. 22 together with the results of Experimental examples 7 to 9. In FIG. 22, the horizontal axis is the diffraction angle 2θ, and the vertical axis is the X-ray intensity.

As shown in FIG. 22, the diffraction peak positions were different between the vanadium oxide crystals of Comparative Example 1 and the vanadium oxide crystals of Experimental examples 7 to 9.

From FIG. 22, it was confirmed that in Comparative Example 1, crystals of vanadium pentoxide were growing.

The positive electrode active materials of Experimental examples 7 to 9 and Comparative Example 1 were observed using a scanning electron microscope (SEM). The results were shown in FIGS. 20A, 20B, 23A, 23B, 24A, 24B, 25A, and 25B.

Figure 24A:
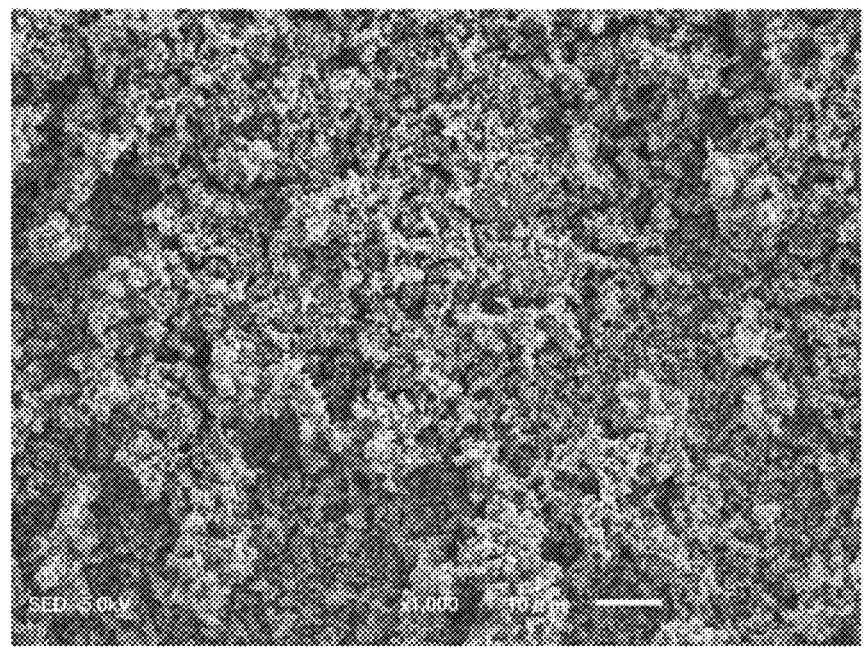
FIG. 24A is a scanning electron micrograph of Experimental example 8.
Figure 24B:
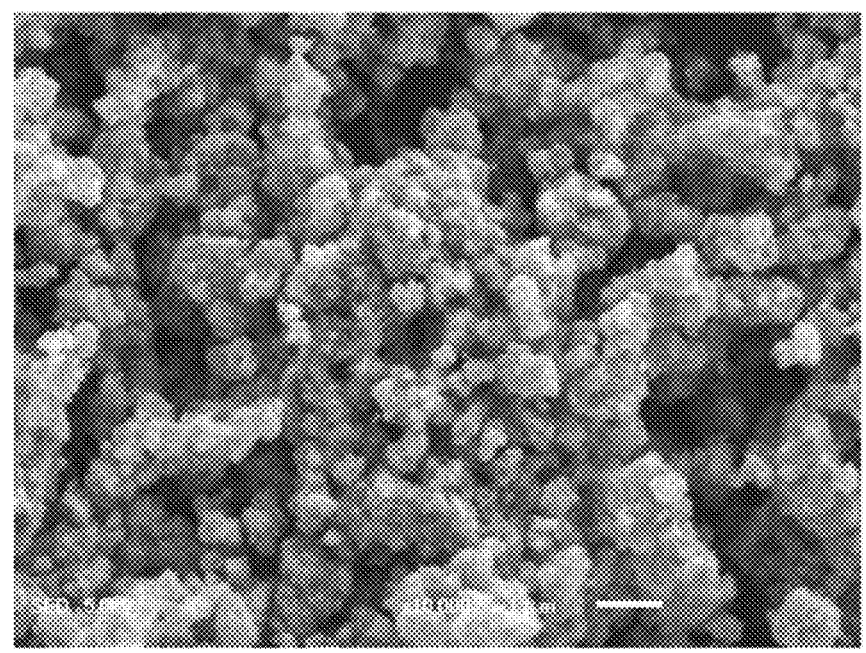
FIG. 24B is a scanning electron micrograph of Experimental example 8.
Figure 25A:
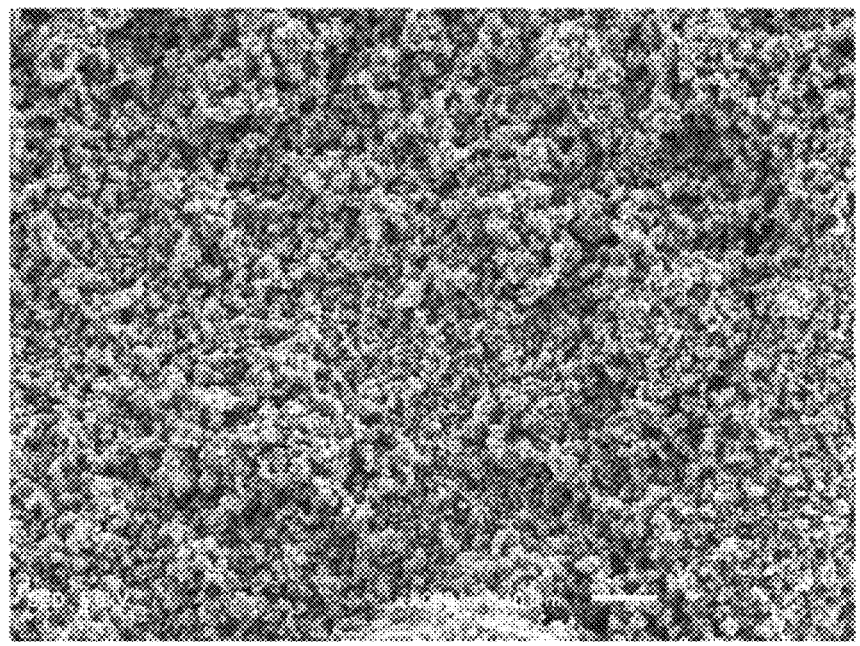
FIG. 25A is a scanning electron micrograph of Experimental example 9.
Figure 25B:
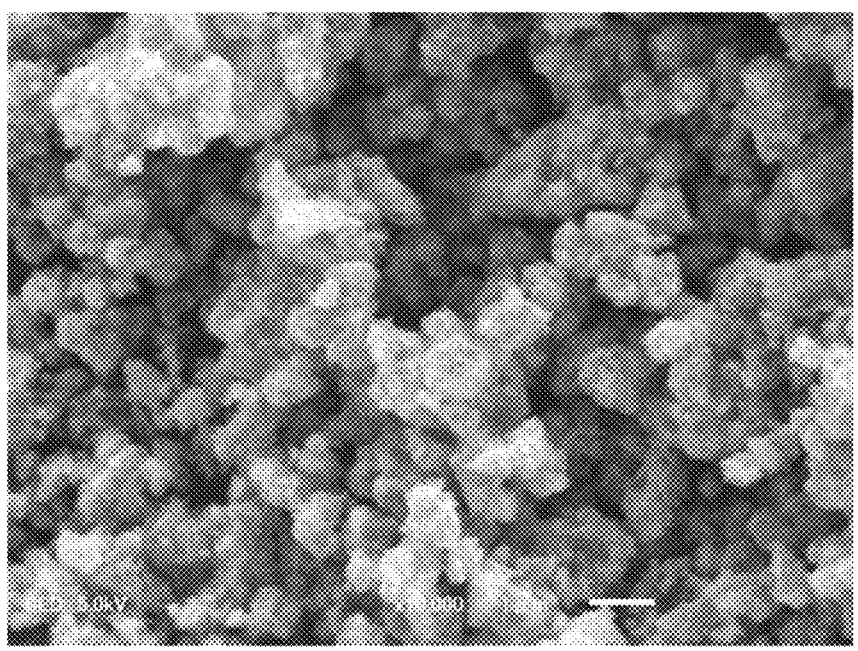
FIG. 25B is a scanning electron micrograph of Experimental example 9.

FIGS. 23A and 23B were images of the positive electrode active material of Experimental example 7, FIGS. 24A and 24B were images of the positive electrode active material of Experimental example 8, and FIGS. 25A and 25B were images of the positive electrode active material of Experimental example 9. FIG. 20A and FIG. 20B were images of the positive electrode active material of Comparative Example 1. The scanning electron micrographs of FIGS. 20B, 23B, 24B, and 25B show enlarged portions of the scanning electron micrographs of FIGS. 20A, 23A, 24A, and 25A, respectively.

As shown in FIG. 23A, FIG. 23B, FIG. 24A, FIG. 24B, FIG. 25A, and FIG. 25B, in Experimental examples 7 to 9 in which vanadium oxide crystals were precipitated at 70° C. to 90° C., particles composed of nucleus and vanadium oxide crystals starting from nucleus formed, and the maximum length of the vanadium oxide crystals in the major axis direction was 5 µm or less.

In addition, as shown in FIGS. 23A, 23B, 24A, 24B, 25A, and 25B, in Experimental examples 7 to 9 in which vanadium oxide crystals were precipitated at 70° C. to 90° C., the temperature at which the crystals were precipitated was determined. However, the maximum length of the vanadium oxide crystals in the major axis direction was 0.5 µm or less.

Figure 14:
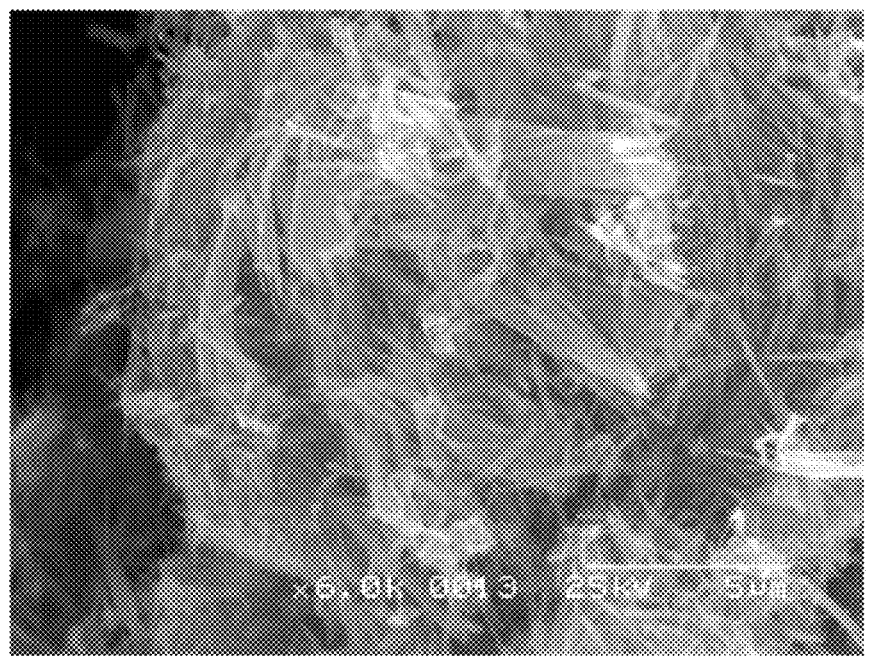
FIG. 14 is a scanning electron micrograph of Experimental example 6.
Figure 15:
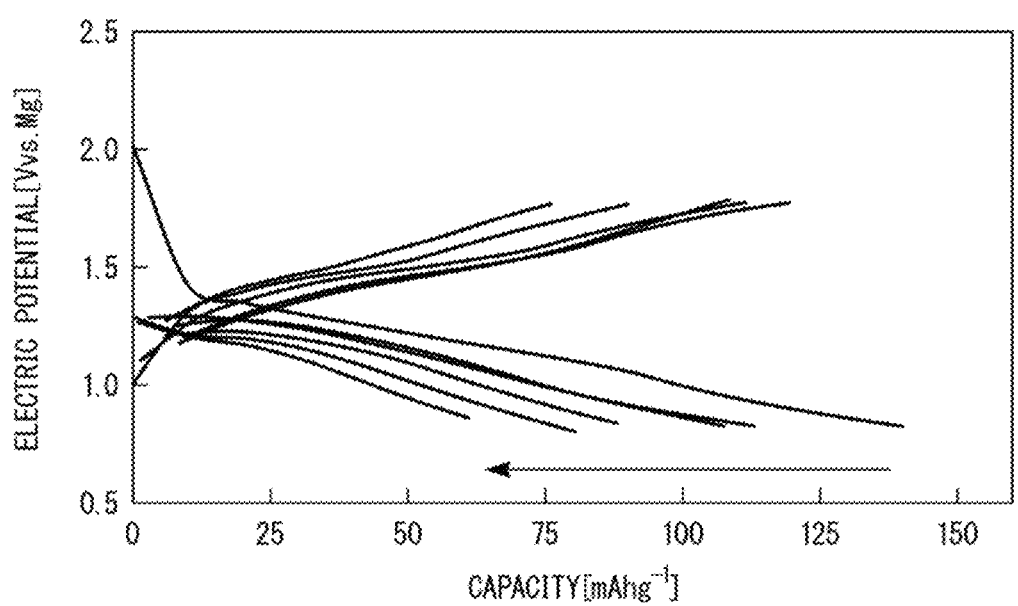
FIG. 15 is a graph showing the relationship between the capacity and electric potential of a positive electrode material in a magnesium secondary battery formed using the positive electrode active material of Experimental example 1.
Figure 16:
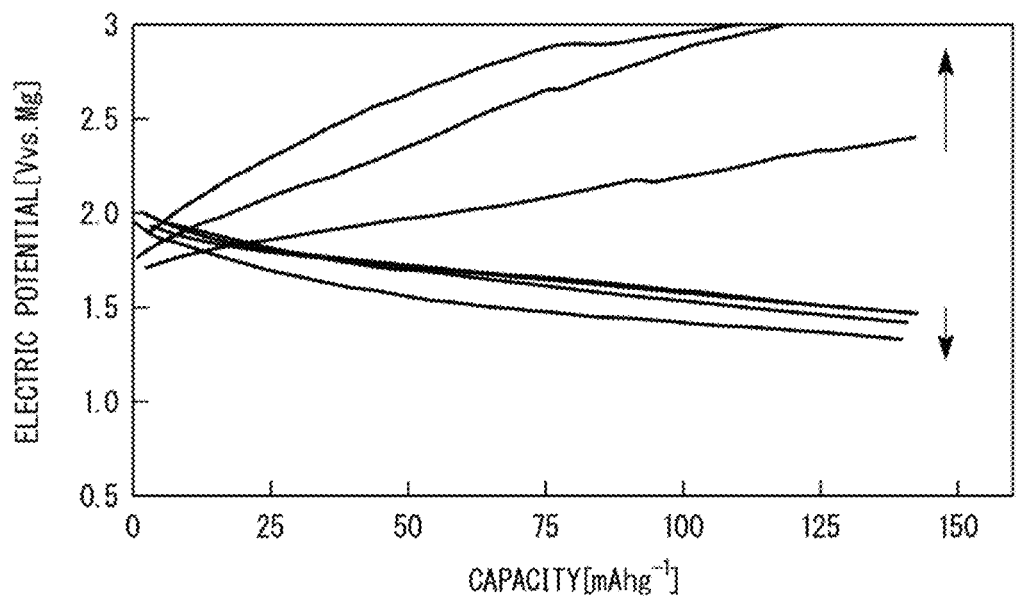
FIG. 16 is a graph showing the relationship between the capacity and electric potential of a positive electrode material in a magnesium secondary battery formed using the positive electrode active material of Experimental example 2.
Figure 17:
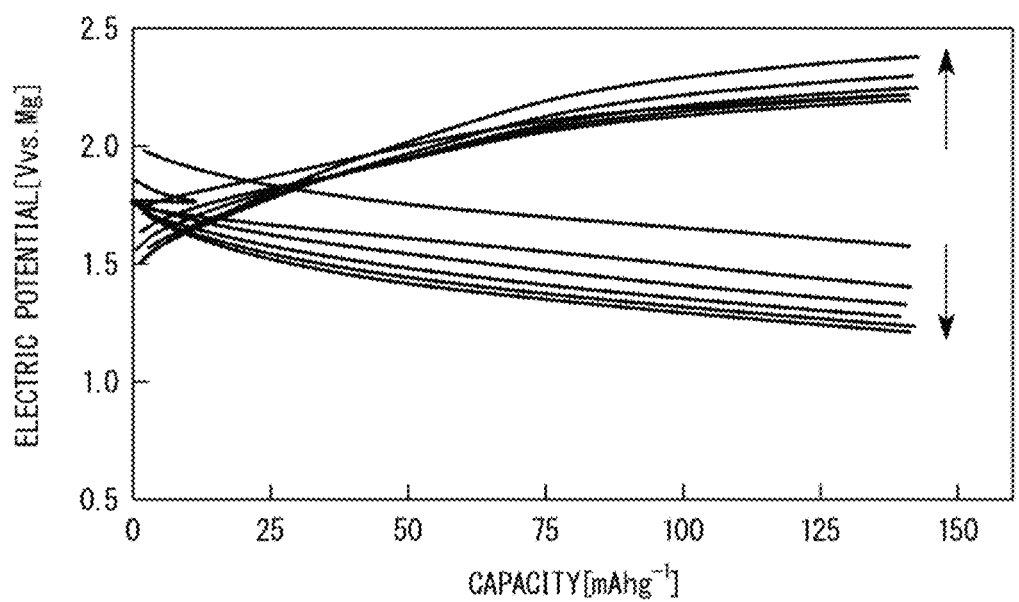
FIG. 17 is a graph showing the relationship between the capacity and electric potential of a positive electrode material in a magnesium secondary battery formed using the positive electrode active material of Experimental example 3.
Figure 18:
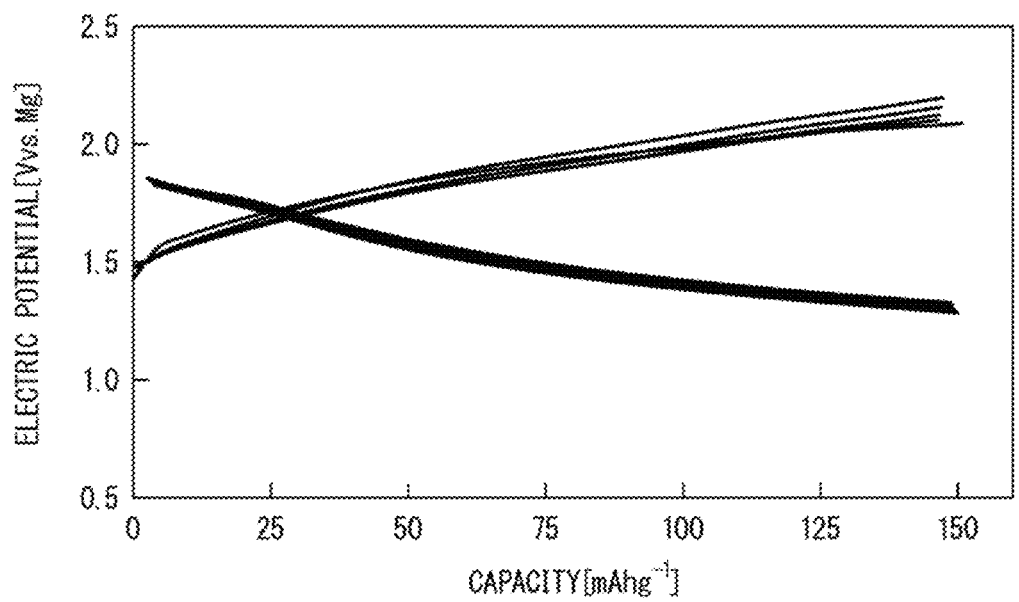
FIG. 18 is a graph showing the relationship between the capacity and electric potential of a positive electrode material in a magnesium secondary battery formed using the positive electrode active material of Experimental example 4.
Figure 19:
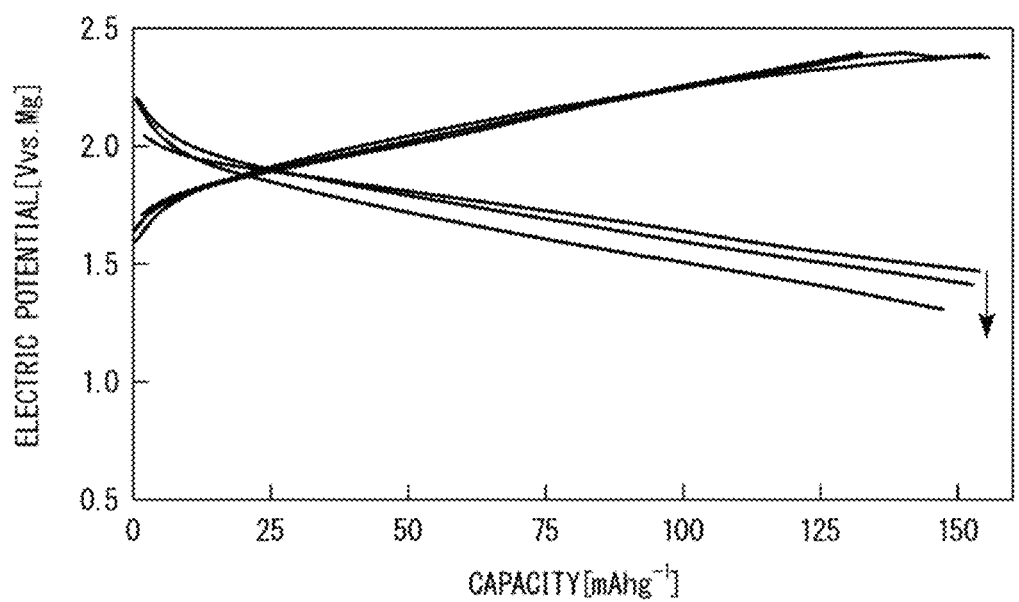
FIG. 19 is a graph showing the relationship between the capacity and electric potential of a positive electrode material in a magnesium secondary battery formed using the positive electrode active material of Experimental example 5.

In contrast, when vanadium oxide crystals were precipitated in an acidic solution containing no nucleation material, as shown in FIG. 14 (Experimental example 6 in which vanadium oxide crystals were precipitated at 80° C.) and FIGS. 20A and 20B (Comparative Example 1 in which vanadium oxide crystals were precipitated at 90° C.), vanadium oxide crystals having a length exceeding 5 µm in the major axis direction were precipitated.

This is assumed to be because the crystal growth was inhibited by the inclusion of the nucleation material solution in Experiments 7 to 9.

The yields of the positive electrode active materials of Experimental examples 8, 9 and Comparative Example 1 were calculated in the same manner as in the positive electrode active material of Example 1 (Experimental example 7). As a result, the yield of the positive active material of Experimental example 7 was 90%, the yield of the positive active material of Experimental example 8 was 98%, the yield of the positive active material of Experimental example 9 was 98%, and the yield of the positive active material of Comparative Example 1 was 85%.

The vanadium oxide crystals of Experimental examples 7 to 9 and Comparative Example 1 all had good yields.

"Magnesium Secondary Battery"

Using the positive electrode active material of Experimental example 9, a magnesium secondary battery was formed in the same manner as in Example 1, and a charge/discharge device (trade name: TOSCAT3100: manufactured by Toyo System Co., Ltd.) was used at a temperature of 35° C. and a capacity of 140 mAh/g. The charge/discharge test was repeated three times under the conditions of a charge/discharge rate of 0.2 C, and the relationship between the capacity of the positive electrode material and the voltage (charge/discharge curve) was examined. The results are shown in FIG. 30.

"Lithium Ion Secondary Battery"

Using the positive electrode active materials of Experimental examples 8 and 9, a test cell of a lithium ion secondary battery was formed in the same manner as in Example 1, and the charge/discharge characteristics were evaluated. The result of Experimental example 8 was shown in FIG. 26, and the result of Experimental example 9 is shown in FIG. 27.

Figure 26:
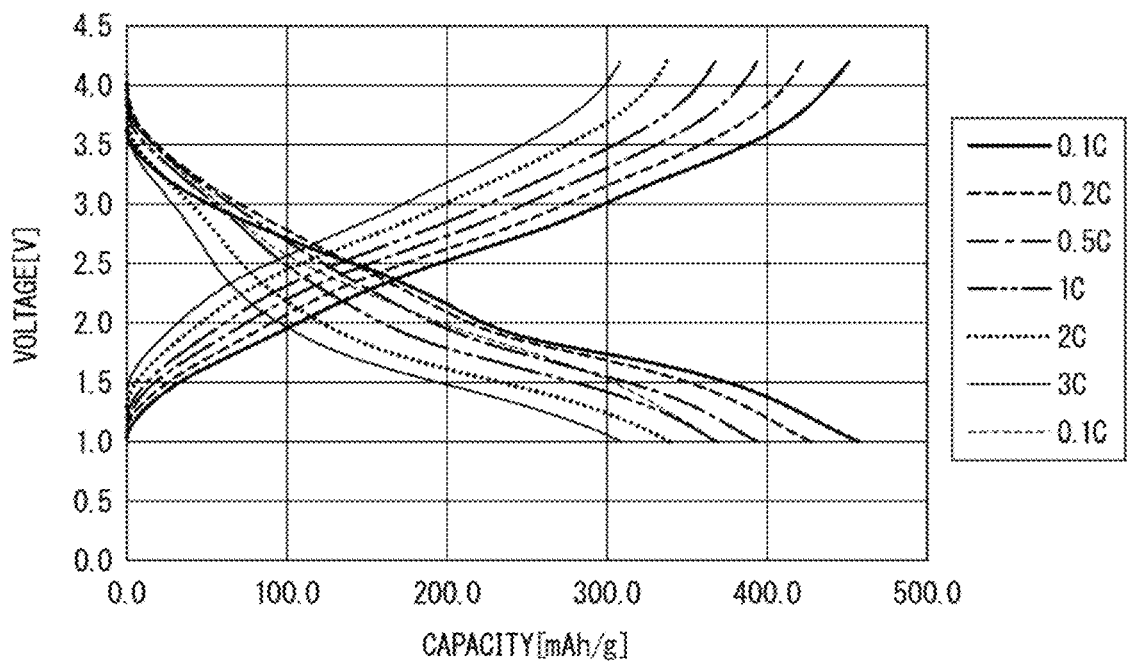
FIG. 26 is a graph showing a relationship between the capacity and voltage of a positive electrode material in a lithium ion secondary battery formed using the positive electrode active material of Experimental example 8.
Figure 27:
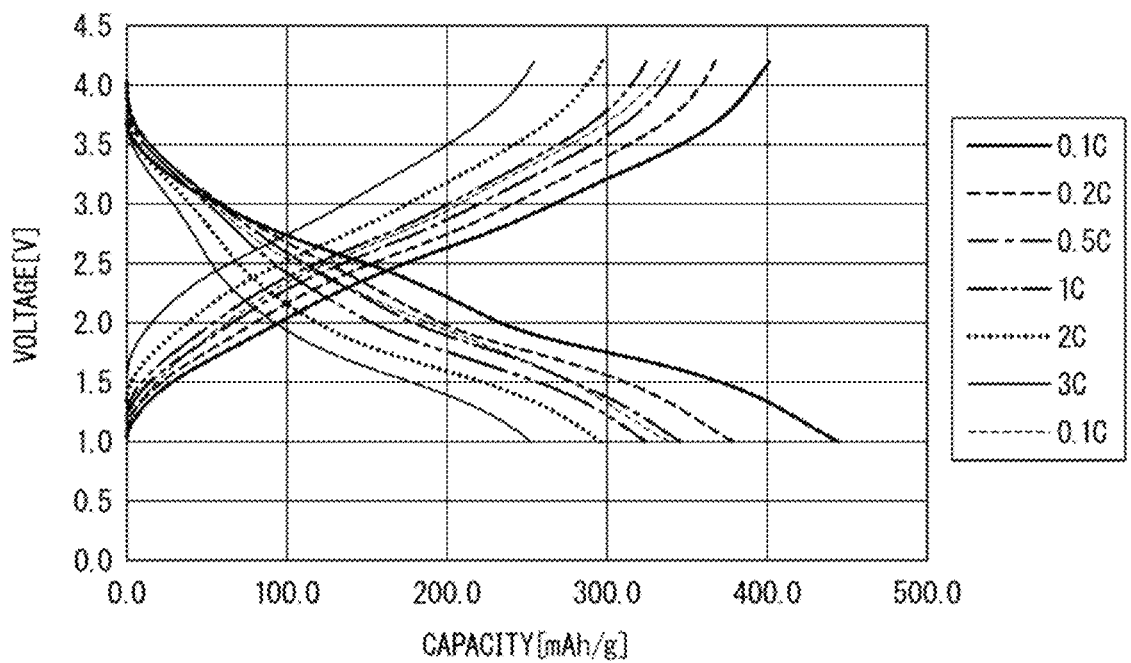
FIG. 27 is a graph showing the relationship between the capacity and voltage of a positive electrode material in a lithium ion secondary battery formed using the positive electrode active material of Experimental example 9.

As shown in FIGS. 26 and 27, the positive electrode material of the lithium ion secondary battery using the positive electrode active material of Experimental example 8 and Experimental example 9 had better rate characteristics than the cell using the positive electrode active material of Comparative Example 1, as shown in FIG. 8.

EXPLANATION OF SYMBOLS

100 Secondary Battery
110 Positive Electrode
115 Positive Active Material
120 Separator
125 Electrolyte
130 Negative Electrode

The invention claimed is:

1. A positive electrode active material for a magnesium secondary battery or lithium ion secondary battery, comprising:
    a particle comprising
        a nucleus and
        a crystal of ammonium vanadate grown from the nucleus as a starting point and having a maximum length of 5 µm or less in a major axis direction,
    wherein the nucleus is formed of titanium sulfate or iron sulfate.

2. A positive electrode comprising the positive electrode active material according to claim 1.

3. A secondary battery comprising the positive electrode according to claim 2, wherein the secondary battery is a lithium ion secondary battery or a magnesium secondary battery.

4. A method for producing a positive electrode active material for a magnesium secondary battery or a lithium ion secondary battery, comprising:
    a step (1) of mixing a nucleation material solution in which the nucleation material is dissolved or dispersed and a solution containing a vanadium compound to form a mixed solution;
    a step (2) of adjusting the mixed solution to be acidic; and
    a precipitation step (3) of precipitating a crystal of vanadium oxide, wherein the precipitation step (3) is
        a step (3a) of precipitating vanadium oxide starting from a nucleus by precipitating the nucleus in the mixed solution, or a step (3b) of precipitating vanadium oxide starting from the nucleation material dispersed in the mixed solution, and wherein the nucleation material is at least one selected from the group consisting of titanium sulfate and iron sulfate, resulting in the positive electrode active material of claim 1.

5. The method for producing the positive electrode active material according to claim 4, wherein the precipitation step is performed at a temperature of 50 to 100° C.

6. The method for producing the positive electrode active material according to claim 4, wherein the mixed solution comprises a carbonate compound.

7. The method for producing the positive electrode active material according to claim 6, wherein the carbonate compound is at least one selected from the group consisting of sodium carbonate, ammonium carbonate, potassium carbonate, lithium carbonate, sodium hydrogen carbonate, ammonium hydrogen carbonate, and potassium hydrogen carbonate.

8. The method for producing the positive electrode active material according to claim 4, further comprising a step of firing the ammonium vanadate crystals precipitated in the precipitation step at a temperature of 260 to 315 C.

9. A positive electrode active material for a magnesium secondary battery or lithium ion secondary battery, comprising:

a particle comprising
   a nucleus and
   a crystal of ammonium vanadate grown from the nucleus as a starting point and having a maximum length of 5 μm or less in a major axis direction,
wherein the nucleus is formed of a titanium compound.

* * * * *